US011319889B2

(12) United States Patent
Kitazume et al.

(10) Patent No.: US 11,319,889 B2
(45) Date of Patent: May 3, 2022

(54) ABNORMALITY DIAGNOSIS SYSTEM OF DOWNSTREAM SIDE AIR-FUEL RATIO DETECTION DEVICE

(71) Applicant: TOYOTA JIDOSHA KABUSHIKI KAISHA, Toyota (JP)

(72) Inventors: Yoshiyuki Kitazume, Hadano (JP); Kazuhiro Wakao, Susono (JP); Keiichiro Aoki, Sunto-gun (JP); Yasutaka Kamiya, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/136,472

(22) Filed: Dec. 29, 2020

(65) Prior Publication Data
US 2021/0231072 A1 Jul. 29, 2021

(30) Foreign Application Priority Data
Jan. 24, 2020 (JP) .............................. JP2020-010078

(51) Int. Cl.
*F02D 41/14* (2006.01)
(52) U.S. Cl.
CPC ..... *F02D 41/1495* (2013.01); *F02D 41/1454* (2013.01); *F02D 2200/0814* (2013.01)
(58) Field of Classification Search
CPC .. F02D 41/14; F02D 41/1454; F02D 41/1495; F02D 2200/0814
USPC .............. 701/103, 104, 106, 114; 73/114.71, 73/114.72
See application file for complete search history.

(56) References Cited

U.S. PATENT DOCUMENTS

| 2003/0046927 | A1* | 3/2003 | Nagai | F02D 41/0235 60/285 |
| 2015/0086428 | A1* | 3/2015 | Kitaura | F02D 41/1439 422/119 |
| 2016/0290269 | A1* | 10/2016 | Okazaki | F02D 41/1495 |
| 2017/0058749 | A1* | 3/2017 | Miyamoto | F01N 11/005 |
| 2017/0370302 | A1* | 12/2017 | Nakamura | F02D 41/0052 |
| 2018/0073458 | A1* | 3/2018 | Hayashita | F02D 41/1456 |
| 2020/0263591 | A1* | 8/2020 | Matsumura | F02D 45/00 |

FOREIGN PATENT DOCUMENTS

JP 2012-052462 A 3/2012

\* cited by examiner

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

The abnormality diagnosis system 1 of a downstream side air-fuel ratio detection device 41, 42, comprises an air-fuel ratio control part 71 controlling an air-fuel ratio of an air-fuel mixture, an abnormality judgment part 72 judging abnormality of the downstream side air-fuel ratio detection device based on a characteristic of change of output of the downstream side air-fuel ratio detection device when the air-fuel ratio control part makes the air-fuel ratio of the air-fuel mixture change, and an oxygen change calculation part 73 calculating an amount of change of an oxygen storage amount of the catalyst when the air-fuel ratio control part makes the air-fuel ratio of the air-fuel mixture change. The abnormality judgment part does not judge abnormality of the downstream side air-fuel ratio detection device when the amount of change of the oxygen storage amount is less than a lower limit threshold value.

13 Claims, 15 Drawing Sheets

FIG. 1
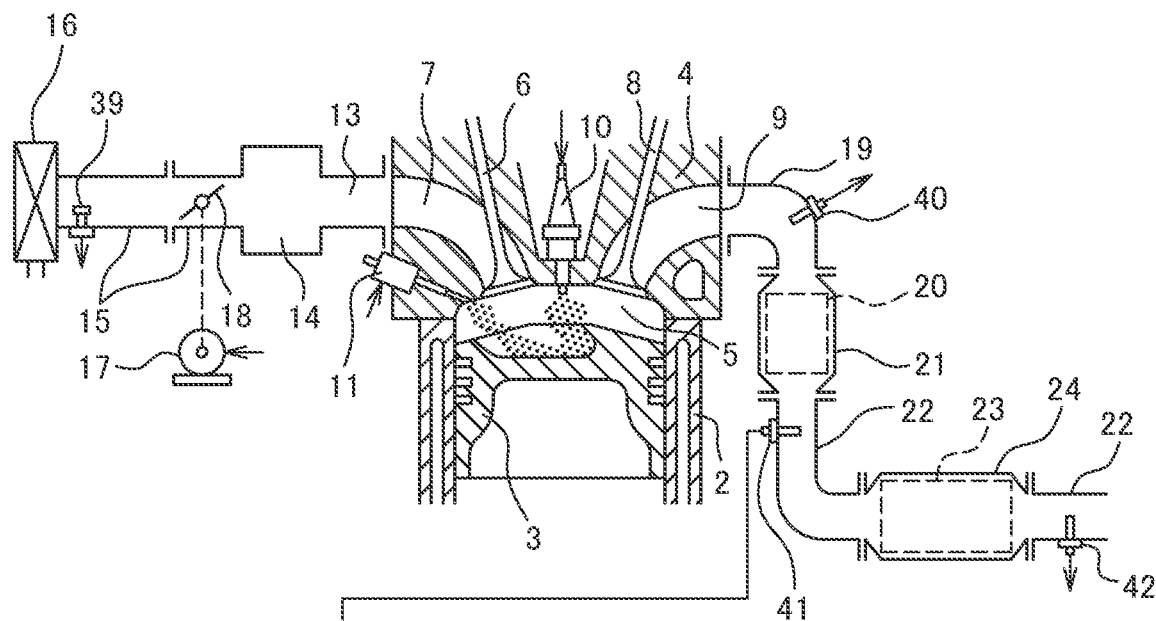
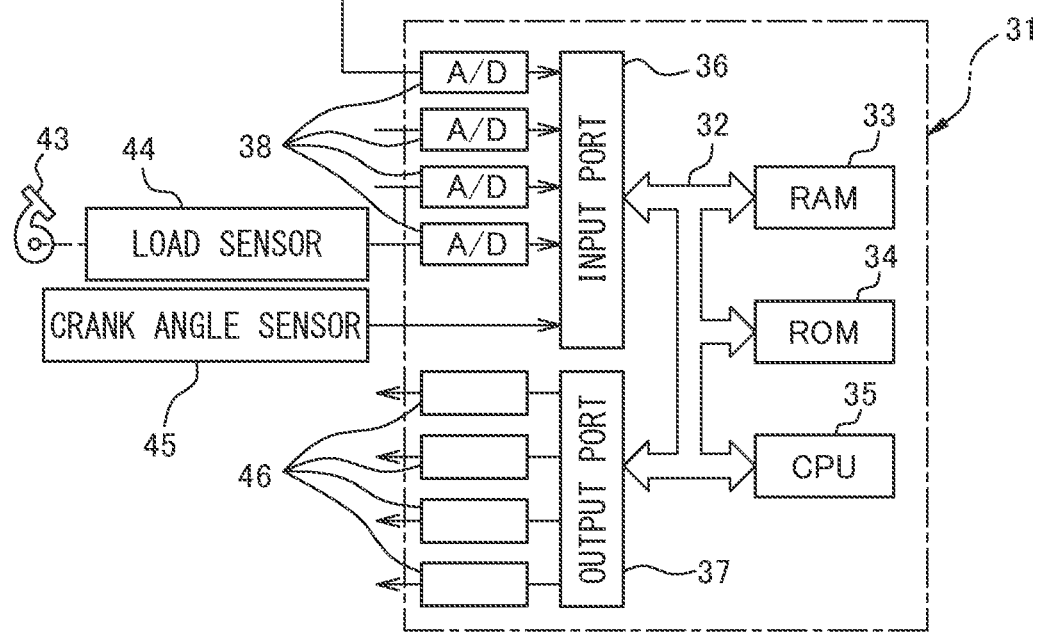

ABNORMALITY DIAGNOSIS SYSTEM OF DOWNSTREAM SIDE AIR-FUEL RATIO DETECTION DEVICE

FIELD

The present invention relates to an abnormality diagnosis system of a downstream side air-fuel ratio detection device.

BACKGROUND

It has been known in the past to arrange a catalyst able to store oxygen in an exhaust passage of an internal combustion engine and remove HC, CO, NOx, etc., in the exhaust gas in a catalyst.

However, when an oxygen storage amount of the catalyst is near a maximum oxygen storage amount, a purification performance of the catalyst with respect to exhaust gas with an air-fuel ratio leaner than a stoichiometric air-fuel ratio falls. As a result, NOx flows out from the catalyst and the air-fuel ratio of the exhaust gas flowing out from the catalyst becomes leaner than the stoichiometric air-fuel ratio.

On the other hand, when the oxygen storage amount of the catalyst is near zero, the purification performance of the catalyst with respect to exhaust gas with an air-fuel ratio richer than the stoichiometric air-fuel ratio falls. As a result, HC and CO flow out from the catalyst and the air-fuel ratio of the exhaust gas flowing out from the catalyst becomes richer than the stoichiometric air-fuel ratio.

For this reason, in order to keep exhaust emission from deteriorating, it is desirable to control by feedback the air-fuel ratio of the air-fuel mixture based on an output of a downstream side air-fuel ratio detection device arranged at a downstream side of the catalyst. However, such a downstream side air-fuel ratio detection device gradually deteriorates along with use, and the response characteristic sometimes deteriorates.

As opposed to this, in the deterioration diagnosis device described in PTL 1, deterioration of the downstream side air-fuel ratio detection device is judged based on the output of the downstream side air-fuel ratio detection device when a fuel cut is performed. Further, in order to reduce the effect of the oxygen storage action of the catalyst, judgment of deterioration of the downstream side air-fuel ratio detection device is prohibited if the value of a parameter such as a cumulative value of an amount of intake air from when the fuel cut is started to when oxygen reached the downstream side air-fuel ratio detection device is less than a threshold value.

CITATIONS LIST

Patent Literature

[PTL 1] Japanese Unexamined Patent Publication No. 2012-52462

SUMMARY

Technical Problem

However, in the above technique, deterioration of the downstream side air-fuel ratio detection device is judged only when performing a fuel cut, therefore it is not possible to diagnose abnormality at a desired timing. Further, if abnormality is diagnosed at a time other than a fuel cut, even if the value of a parameter like the cumulative value of the amount of intake air is equal to or more than a threshold value, the oxygen storage amount of the catalyst at the time of diagnosis of abnormality changes in accordance with the air-fuel ratio of the air-fuel mixture. Therefore, in the above technique, it is difficult to reduce the effect of the oxygen storage action of the catalyst.

Furthermore, in the above technique, it is assumed that one catalyst is arranged at the upstream side of the downstream side air-fuel ratio detection device. For this reason, if a plurality of catalysts are arranged at the upstream side of the downstream side air-fuel ratio detection device, the effect of the plurality of catalysts on the output of the downstream side air-fuel ratio detection device is not considered at all. Therefore, there is room for improvement of the technique of diagnosis of abnormality of the downstream side air-fuel ratio detection device.

In consideration of the above problem, an object of the present invention is to improve the reliability of diagnosis of abnormality of a downstream side air-fuel ratio detection device arranged at a downstream side of catalysts.

Solution to Problem

The summary of the present disclosure is as follows.

(1) An abnormality diagnosis system of a downstream side air-fuel ratio detection device arranged in an exhaust passage of the internal combustion engine at a downstream side of a catalyst, comprising: an air-fuel ratio control part configured to control an air-fuel ratio of an air-fuel mixture in a combustion chamber of the internal combustion engine; an abnormality judgment part configured to judge abnormality of the downstream side air-fuel ratio detection device based on a characteristic of change of output of the downstream side air-fuel ratio detection device when the air-fuel ratio control part makes the air-fuel ratio of the air-fuel mixture change; and an oxygen change calculation part configured to calculate an amount of change of an oxygen storage amount of the catalyst when the air-fuel ratio control part makes the air-fuel ratio of the air-fuel mixture change, wherein the abnormality judgment part is configured not to judge abnormality of the downstream side air-fuel ratio detection device when the amount of change of the oxygen storage amount is less than a lower limit threshold value.

(2) The abnormality diagnosis system of a downstream side air-fuel ratio detection device described in above (1), wherein the downstream side air-fuel ratio detection device is arranged at a downstream side of a plurality of catalysts, the oxygen change calculation part is configured to calculate the amount of change of the oxygen storage amount when the air-fuel ratio control part makes the air-fuel ratio of the air-fuel mixture change for each of the plurality of catalysts, and the abnormality judgment part is configured not to judge abnormality of the downstream side air-fuel ratio detection device when the amount of change of the oxygen storage amount of at least one catalyst among the plurality of catalysts is less than the lower limit threshold value.

(3) The abnormality diagnosis system of a downstream side air-fuel ratio detection device described in above (1), further comprising an upstream side air-fuel ratio detection device arranged in the exhaust passage at an upstream side of the catalyst, wherein the oxygen change calculation part is configured to calculate the amount of change of the oxygen storage amount based on a difference between an output value of the upstream side air-fuel ratio detection device and an output value of the downstream side air-fuel ratio detection device.

(4) The abnormality diagnosis system of a downstream side air-fuel ratio detection device described in above (2), further comprising upstream side air-fuel ratio detection devices arranged in the exhaust passage at an upstream side of each of the plurality of catalysts, wherein the oxygen change calculation part is configured to calculate the amount of change of the oxygen storage amount based on a difference of output values of the air-fuel ratio detection devices arranged at both sides of the catalyst for each of the plurality of catalysts.

(5) The abnormality diagnosis system of a downstream side air-fuel ratio detection device described in above (2) or (4), wherein at least one of the plurality of catalysts is a four-way catalyst having a filter function for trapping particulate matter in an exhaust gas, and the abnormality judgment part judges is configured not to judge abnormality of the downstream side air-fuel ratio detection device when the amount of change of the oxygen storage amount of the four-way catalyst is larger than an upper limit threshold value larger than the lower limit threshold value.

(6) The abnormality diagnosis system of a downstream side air-fuel ratio detection device described in above (1) or (3), wherein the catalyst is a four-way catalyst having a filter function for trapping particulate matter in an exhaust gas, and the abnormality judgment part is configured not to judge abnormality of the downstream side air-fuel ratio detection device when the amount of change of the oxygen storage amount is larger than an upper limit threshold value larger than the lower limit threshold value.

(7) The abnormality diagnosis system of a downstream side air-fuel ratio detection device described in above (5) or (6), wherein the abnormality judgment part is configured not to judge abnormality of the downstream side air-fuel ratio detection device when judging that particulate matter has been burned at the four-way catalyst when the air-fuel ratio control part makes the air-fuel ratio of the air-fuel mixture change.

Advantageous Effects of Invention

According to the present invention, it is possible to improve the reliability of diagnosis of abnormality of a downstream side air-fuel ratio detection device arranged at a downstream side of catalysts.

BRIEF DESCRIPTION OF DRAWINGS

FIG. 1 is a view schematically showing an internal combustion engine in which an abnormality diagnosis system of a downstream side air-fuel ratio detection device according to a first embodiment of the present invention is provided.

DESCRIPTION OF EMBODIMENTS

Figure 2:
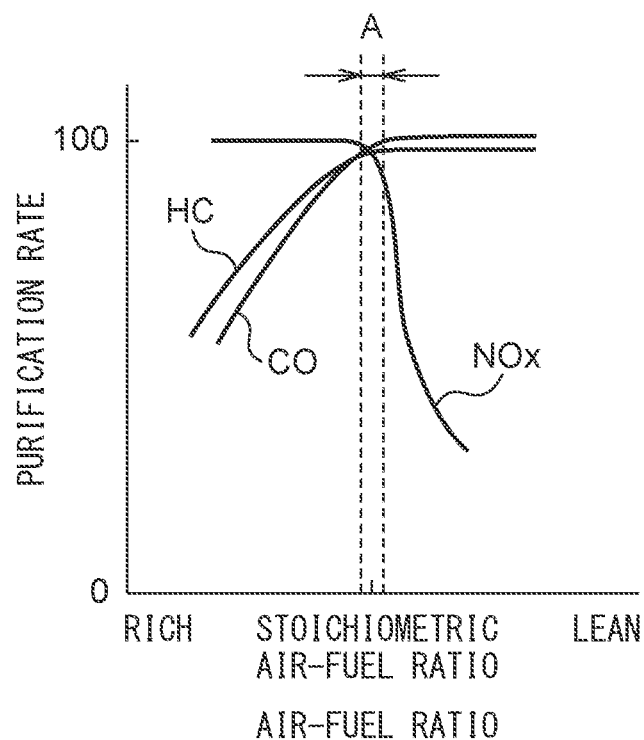
FIG. 2 shows a purification characteristic of a three-way catalyst.

Below, referring to the figures, embodiments of the present invention will be explained in detail. Note that, in the following explanation, similar components are assigned the same reference numerals.

First Embodiment

First, referring to FIG. 1 to FIG. 9, a first embodiment of the present invention will be explained.

<Explanation of Internal Combustion Engine Overall>

FIG. 1 is a view schematically showing an internal combustion engine provided with an abnormality diagnosis system of a downstream side air-fuel ratio detection device according to a first embodiment of the present invention. The internal combustion engine shown in FIG. 1 is a spark ignition type internal combustion engine. The internal combustion engine is mounted in a vehicle.

Referring to FIG. 1, 2 indicates a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to a first casing 21 which has a first catalyst 20 built into it. The first casing 21 is connected through an exhaust pipe 22 to a second casing 24 which has a second catalyst 23 built into it. The exhaust port 9, the exhaust manifold 19, the first casing 21, the exhaust pipe 22, the second casing 24, etc., form an exhaust passage which discharges exhaust gas produced due to combustion of the air-fuel mixture in the combustion chamber 5. The first catalyst 20 is a catalyst arranged on the most upstream side, while the second catalyst 23 is the catalyst arranged on the most downstream side.

Various control routines of the internal combustion engine are performed by an electronic control unit (ECU) 31. That is, the ECU 31 functions as a control device of the internal combustion engine. Outputs of various sensors provided in the internal combustion engine are entered into the ECU 31, and the ECU 31 controls various actuators based on the outputs of the sensors, etc.

The ECU 31 is comprised of a digital computer which is provided with components which are connected together through a bidirectional bus 32 such as a RANI (random access memory) 33, ROM (read only memory) 34, CPU (microprocessor) 35, input port 36, and output port 37. Note that, in the present embodiment, a single ECU 31 is provided, but a plurality of ECUs may be provided for each function.

In the intake pipe 15, an air flow meter 39 detecting the flow rate of air which flows through the intake pipe 15 is arranged. The output of the air flow meter 39 is input through a corresponding AD converter 38 to the input port 36.

Further, in the exhaust passage at the upstream side of the first catalyst 20 (a header of the exhaust manifold 19), a first air-fuel ratio sensor 40 is arranged for detecting the air-fuel ratio of the exhaust gas discharged from the combustion chamber 5 of the internal combustion engine and flowing into the first catalyst 20 The output of the first air-fuel ratio sensor 40 is input to an input port 36 through a corresponding AD converter 38.

Further, in the exhaust passage at the downstream side of the first catalyst 20 and at the upstream side of the second catalyst 23 (inside of the exhaust pipe 22 between the first catalyst 20 and the second catalyst 23), a second air-fuel ratio sensor 41 is arranged for detecting the air-fuel ratio of the exhaust gas flowing out of the first catalyst 20 and flowing into the second catalyst 23. The output of the second air-fuel ratio sensor 41 is input to the input port 36 through a corresponding AD converter 38.

Further, in the exhaust passage at the downstream side of the second catalyst 23 (inside of the exhaust pipe 22 at the downstream side of the second catalyst 23), a third air-fuel ratio sensor 42 is arranged for detecting the air-fuel ratio of the exhaust gas flowing out of the second catalyst 23. The output of the third air-fuel ratio sensor 42 is input to the input port 36 through a corresponding AD converter 38.

Further, a load sensor 44 generating an output voltage proportional to the amount of depression of an accelerator pedal 43 is connected to the accelerator pedal 43 provided in the vehicle mounting the internal combustion engine. The output voltage of the load sensor 44 is input to the input port 36 through a corresponding AD converter 38. The ECU 31 calculates the engine load based on the output of the load sensor 44.

Further, a crank angle sensor 45 generating an output pulse each time a crankshaft rotates by a predetermined angle (for example 10°) is connected to the input port 36. This output pulse is input to the input port 36. The ECU 31 calculates the engine speed based on the output of the crank angle sensor 45.

On the other hand, the output port 37 is connected through a corresponding drive circuit 46 to various actuators of the internal combustion engine. In the present embodiment, the output port 37 is connected to spark plugs 10, fuel injectors 11, and a throttle valve drive actuator 17, and the ECU 31 controls these. Specifically, the ECU 31 controls the ignition timings of the spark plugs 10, the injection timings and injection amounts of the fuel injectors, and the opening degree of the throttle valve 18.

Note that, the above-mentioned internal combustion engine is a non-supercharged internal combustion engine fueled by gasoline, but the configuration of the internal combustion engine is not limited to the above configuration. Therefore, the cylinder array, mode of injection of fuel, configuration of the intake and exhaust systems, configuration of the valve operation mechanism, presence of any supercharger, and other specific configurations of the internal combustion engine may be different from the configuration shown in FIG. 1. For example, the fuel injectors 11 may be arranged so as to inject fuel to inside the intake ports 7.

<Explanation of Catalyst>

The first catalyst 20 and the second catalyst 23 arranged in the exhaust passage have similar configurations. For this reason, below, the first catalyst 20 will be explained. The first catalyst 20 can store oxygen, and for example, is a three-way catalyst able to simultaneously remove hydrocarbons (HC), carbon monoxide (CO), and nitrogen oxides (NOx). The first catalyst 20 has a support comprised of a ceramic, metal, etc., and a precious metal having a catalytic action (for example, platinum (Pt), palladium (Pd), rhodium (Rh), etc.,) and a co-catalyst having an oxygen storage ability (for example, ceria ($CeO_2$) etc.). The precious metal and co-catalyst are supported on the support.

FIG. 2 shows purification characteristics of a three-way catalyst. As shown in FIG. 2, the purification rates of HC, CO and NOx by the first catalyst 20 become extremely high when the air-fuel ratio of the exhaust gas flowing into the first catalyst 20 is in the region near the stoichiometric air-fuel ratio (purification window A in FIG. 2). Therefore, the first catalyst 20 can effectively remove HC, CO and NOx if the air-fuel ratio of the exhaust gas is maintained at the stoichiometric air-fuel ratio.

Further, the first catalyst 20 stores or releases oxygen in accordance with the air-fuel ratio of the exhaust gas by the co-catalyst. Specifically, the first catalyst 20 stores excess oxygen in the exhaust gas when the air-fuel ratio of the exhaust gas is leaner than the stoichiometric air-fuel ratio. On the other hand, the first catalyst 20 releases the amount of additional oxygen required for making HC and CO oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the first catalyst 20 is maintained near the stoichiometric air-fuel ratio, and HC, CO and NOx are effectively removed at the first catalyst 20.

<Output Characteristic of Air-Fuel Ratio Sensor>

The first air-fuel ratio sensor 40, the second air-fuel ratio sensor 41, and the third air-fuel ratio sensor 42 arranged in the exhaust passage have similar configurations. For this reason, below, referring to FIG. 3 and FIG. 4, the output characteristics of the first air-fuel ratio sensor 40 will be explained.

Figure 3:
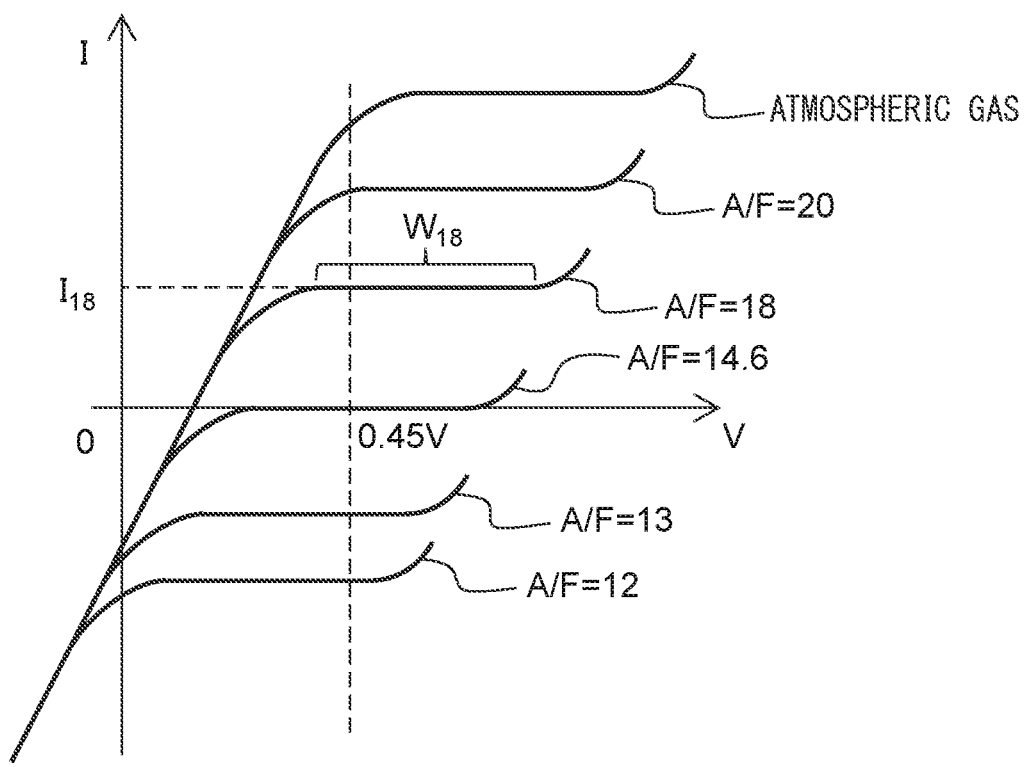
FIG. 3 is a view showing a voltage-current characteristic of a first air-fuel ratio sensor.

FIG. 3 is a view showing a voltage-current (V-I) characteristic of the first air-fuel ratio sensor 40. As will be understood from FIG. 3, in the first air-fuel ratio sensor 40, the output current I becomes larger the higher (leaner) the air-fuel ratio of the exhaust gas. Further, the V-I lines at the different air-fuel ratios include regions substantially parallel to the V-axis, that is, regions where the output current does not change much even if the sensor applied voltage changes. This voltage region is called the "limit current region", while the current at this time is called the "limit current". In FIG. 3, the limit current region and the limit current when the exhaust air-fuel ratio is 18 are shown by $W_{18}$ and $I_{18}$. Therefore, the first air-fuel ratio sensor 40 is a limit current type of air-fuel ratio sensor.

Figure 4:
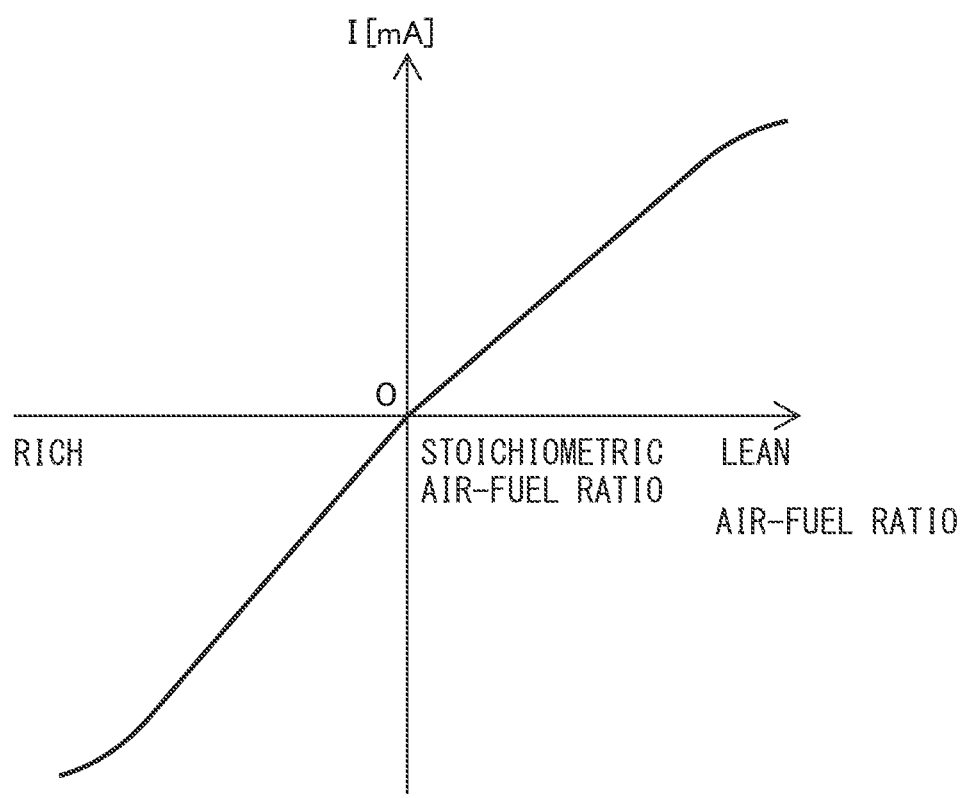
FIG. 4 is a view showing a relationship of an air-fuel ratio of the exhaust gas and an output current I when a sensor applied voltage is 0.45V.

FIG. 4 is a view showing the relationship between the air-fuel ratio of the exhaust gas and the output current I when the sensor applied voltage is 0.45V. That is, FIG. 4 shows the relationship between the air-fuel ratio of the exhaust gas and the output current I at points on the broken line of FIG. 3. As will be understood from FIG. 4, when the air-fuel ratio of the exhaust gas is the stoichiometric air-fuel ratio, the output current I of the first air-fuel ratio sensor 40 becomes zero. Further, in the first air-fuel ratio sensor 40, the higher the air-fuel ratio of the exhaust gas, that is, the leaner the air-fuel ratio of the exhaust gas, the larger the output current I of the first air-fuel ratio sensor 40. Therefore, the output of the first air-fuel ratio sensor 40 (output current I) becomes larger proportionally to the air-fuel ratio of the exhaust gas. The first air-fuel ratio sensor 40 can continuously (linearly) detect the air-fuel ratio of the exhaust gas.

<Abnormality Diagnosis System of Downstream Side Air-Fuel Ratio Detection Device>

However, air-fuel ratio detection devices such as the first air-fuel ratio sensor 40, the second air-fuel ratio sensor 41, and the third air-fuel ratio sensor 42 gradually deteriorate along with use and sometimes the response characteristic deteriorates. In particular, in order to precisely gauge the state of the exhaust gas flowing out from the catalysts, it is necessary to monitor the state of deterioration of the downstream side air-fuel ratio detection device arranged at the downstream side of the catalysts.

Figure 5:
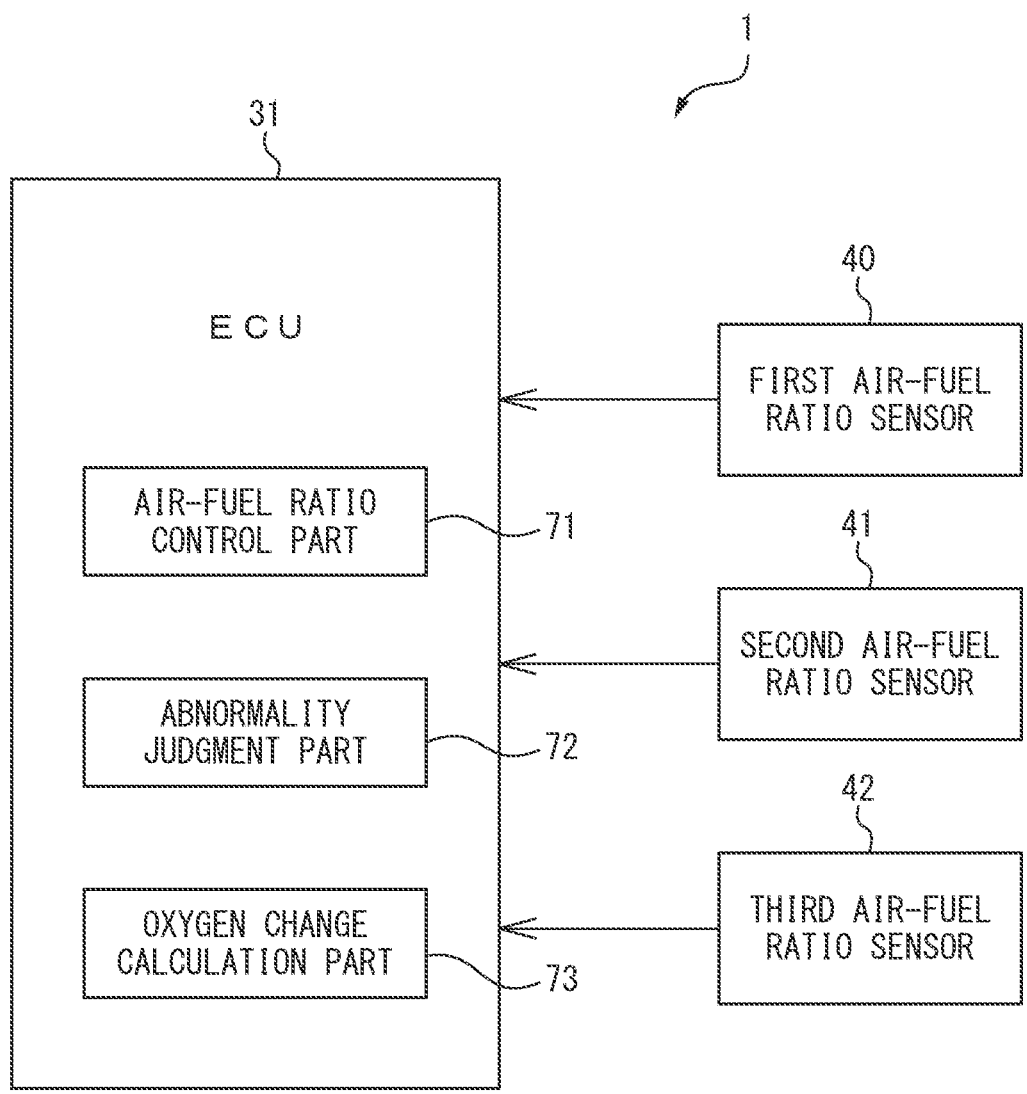
FIG. 5 is a block diagram schematically showing the configuration of an abnormality diagnosis system according to the first embodiment of the present invention.

Therefore, in the present embodiment, an abnormality diagnosis system of a downstream side air-fuel ratio detection device for diagnosing abnormality of a downstream side air-fuel ratio detection device (below, simply referred to as an "abnormality diagnosis system") is provided at the internal combustion engine. FIG. 5 is a block diagram schematically showing the configuration of an abnormality diagnosis system 1 according to the first embodiment of the present invention. The abnormality diagnosis system 1 is provided with the first air-fuel ratio sensor 40, the second air-fuel ratio sensor 41, an air-fuel ratio control part 71, an abnormality judgment part 72, and an oxygen change calculation part 73 and diagnoses abnormality of the third air-fuel ratio sensor 42. The first air-fuel ratio sensor 40 and the second air-fuel ratio sensor 41 are examples of upstream side air-fuel ratio detection devices, while the third air-fuel ratio sensor 42 is an example of a downstream side air-fuel ratio detection device. Further, in the present embodiment, the ECU 31 functions as the air-fuel ratio control part 71, the abnormality judgment part 72, and the oxygen change calculation part 73.

The air-fuel ratio control part 71 controls the air-fuel ratio of the air-fuel mixture in the combustion chambers 5 of the internal combustion engine, that is, the air-fuel ratio of the exhaust gas discharged from the combustion chambers 5 to the exhaust passage. Specifically, the air-fuel ratio control part 71 sets a target air-fuel ratio of the air-fuel mixture and controls the amounts of fuel injection of the fuel injectors 11 so that the air-fuel ratio of the air-fuel mixture matches the target air-fuel ratio. For example, the air-fuel ratio control part 71 controls by feedback the amounts of fuel injection of the fuel injectors 11 so that the output air-fuel ratio of the first air-fuel ratio sensor 40 matches the target air-fuel ratio. Here, the "output air-fuel ratio of the air-fuel ratio sensor" means an air-fuel ratio corresponding to the output value of the air-fuel ratio sensor, that is, an air-fuel ratio detected by the air-fuel ratio sensor.

Note that, the air-fuel ratio control part 71 may control the amounts of fuel injection of the fuel injectors 11 so that the air-fuel ratio of the air-fuel mixture matches the target air-fuel ratio without using the first air-fuel ratio sensor 40. In this case, the air-fuel ratio control part 71 supplies the amounts of fuel calculated from the amount of intake air detected by the air flow meter 39 and the target air-fuel ratio from the fuel injectors 11 to the combustion chambers 5 so that the ratio of the amounts of fuel injection of the fuel injectors 11 and the air matches the target air-fuel ratio.

In the first embodiment, when abnormality of the third air-fuel ratio sensor 42 is diagnosed, the air-fuel ratio control part 71 makes the air-fuel ratio of the air-fuel mixture leaner than the stoichiometric air-fuel ratio. Specifically, the air-fuel ratio control part 71 switches the target air-fuel ratio of the air-fuel mixture from the stoichiometric air-fuel ratio to a value leaner than the stoichiometric air-fuel ratio.

The abnormality judgment part 72 judges abnormality of the third air-fuel ratio sensor 42 based on the characteristic of change of output of the third air-fuel ratio sensor 42 when the air-fuel ratio control part 71 makes the air-fuel ratio of the air-fuel mixture change. If the response characteristic of the third air-fuel ratio sensor 42 deteriorates, when the air-fuel ratio of the exhaust gas flowing into the third air-fuel ratio sensor 42 changes, the output of the third air-fuel ratio sensor 42 changes more slowly. For this reason, the abnormality judgment part 72 judges that the third air-fuel ratio sensor 42 is abnormal for example if the time when the output of the third air-fuel ratio sensor 42 passes a predetermined output section is longer than a reference value. The predetermined output section and the reference value are set based on the target air-fuel ratio of the air-fuel mixture.

In this regard, as shown in FIG. 1, the third air-fuel ratio sensor 42 is arranged in the exhaust passage of the internal combustion engine at the downstream side of a plurality of catalysts (first catalyst 20 and second catalyst 23). For this reason, the output of the third air-fuel ratio sensor 42 is affected by the exhaust purification at the first catalyst 20 and the second catalyst 23.

Figure 6:
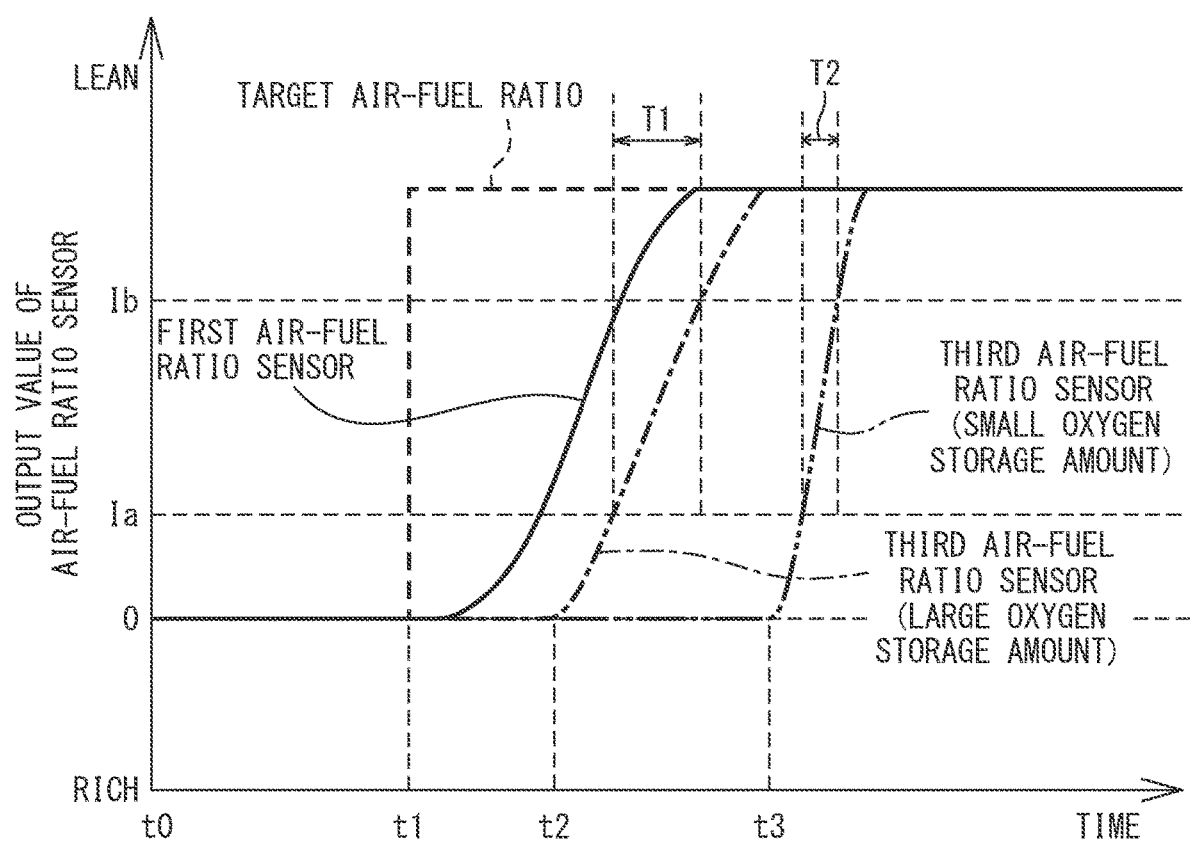
FIG. 6 is a time chart of the output value of a first air-fuel ratio sensor and an output value of a third air-fuel ratio sensor when making the target air-fuel ratio of the air-fuel mixture change.

FIG. 6 is a time chart of the output value of the first air-fuel ratio sensor 40 and the output value of the third air-fuel ratio sensor 42 when making the target air-fuel ratio of the air-fuel mixture change. FIG. 6 shows the target air-fuel ratio of the air-fuel mixture by a broken line and the output value of the first air-fuel ratio sensor 40 by a solid line. Further, FIG. 6 shows the output value of the third air-fuel ratio sensor 42 when the oxygen storage amounts of the first catalyst 20 and the second catalyst 23 at the time of start of the diagnosis of abnormality are large by a one-dot chain line, while shows the output value of the third air-fuel ratio sensor 42 when the oxygen storage amounts of the first catalyst 20 and the second catalyst 23 at the time of start of the diagnosis of abnormality are small by a two-dot chain line.

In the example of FIG. 6, at the time t0, the target air-fuel ratio of the air-fuel mixture is set to the stoichiometric air-fuel ratio. For this reason, at the time t0, the output values of the first air-fuel ratio sensor 40 and the third air-fuel ratio sensor 42 become zero. After that, at the time t1, for diagnosis of abnormality, the target air-fuel ratio of the air-fuel mixture is switched from the stoichiometric air-fuel ratio to a value leaner than the stoichiometric air-fuel ratio. Along with this, after the time t1, the output value of the first air-fuel ratio sensor 40 changes toward the target air-fuel ratio. At this time, since time is required for the exhaust gas to be switched, the output value of the first air-fuel ratio sensor 40 changes later than the change of the target air-fuel ratio.

On the other hand, exhaust gas passing through the first catalyst 20 and the second catalyst 23 flows into the third air-fuel ratio sensor 42. When the oxygen storage amounts of the first catalyst 20 and the second catalyst 23 are suitable values, due to the storage of oxygen, the atmosphere of the catalyst 20 approaches the stoichiometric air-fuel ratio. As a result, the NOx in the exhaust gas is removed by the first catalyst 20 and the second catalyst 23 and the output value of the third air-fuel ratio sensor 42 is maintained at the stoichiometric air-fuel ratio.

The smaller the oxygen storage amounts of the first catalyst 20 and the second catalyst 23, the greater the amounts of oxygen which can be stored in the first catalyst 20 and the second catalyst 23 when the air-fuel ratio of the exhaust gas is leaner than the stoichiometric air-fuel ratio. For this reason, the time period during which the output value of the third air-fuel ratio sensor 42 is maintained at the stoichiometric air-fuel ratio becomes longer the smaller the oxygen storage amounts of the first catalyst 20 and the second catalyst 23 at the time of start of the diagnosis of abnormality.

If the oxygen storage amounts of the first catalyst 20 and the second catalyst 23 at the time of start of the diagnosis of abnormality are large, the time period until the oxygen storage amounts of the first catalyst 20 and the second catalyst 23 reach the maximum oxygen storage amount becomes shorter. As a result, at the time t2, the output value of the third air-fuel ratio sensor 42 starts to change toward the target air-fuel ratio. At this time, the output value of the first air-fuel ratio sensor 40 has still not reached the target air-fuel ratio. For this reason, the change of the output value of the third air-fuel ratio sensor 42 becomes later.

On the other hand, if the oxygen storage amounts of the first catalyst 20 and the second catalyst 23 at the time of start of the diagnosis of abnormality are small, the time period until the oxygen storage amounts of the first catalyst 20 and the second catalyst 23 reach the maximum oxygen storage amount becomes longer. As a result, at the time t3 after the time t2, the output value of the third air-fuel ratio sensor 42 starts to change toward the target air-fuel ratio. At this time, the output value of the first air-fuel ratio sensor 40 has already reached the target air-fuel ratio. For this reason, the change of the output value of the third air-fuel ratio sensor 42 becomes earlier.

As shown in FIG. 6, if the oxygen storage amounts of the first catalyst 20 and the second catalyst 23 at the time of start of the diagnosis of abnormality are large, the time period until the output of the third air-fuel ratio sensor 42 passes the predetermined output section (in the example of FIG. 6, Ia to Ib) becomes T1. On the other hand, if the oxygen storage amounts of the first catalyst 20 and the second catalyst 23 at the time of start of the diagnosis of abnormality are small, the time period until the output of the third air-fuel ratio sensor 42 passes the predetermined output section becomes T2. The time period T1 when the oxygen storage amounts of the first catalyst 20 and the second catalyst 23 are large is longer than the time period T2 when the oxygen storage amounts of the first catalyst 20 and the second catalyst 23 are small.

For this reason, if the oxygen storage amounts of the first catalyst 20 and the second catalyst 23 are large, even when the third air-fuel ratio sensor 42 is normal, it is liable to be judged that the response characteristic of the third air-fuel ratio sensor 42 is deteriorating. Therefore, when the oxygen storage amounts of the first catalyst 20 and the second catalyst 23 are large, that is, when the amounts of change of the oxygen storage amounts of the first catalyst 20 and the second catalyst 23 when the air-fuel ratio of the air-fuel mixture is made to change to the lean side are small, abnormality of the third air-fuel ratio sensor 42 is liable to be misjudged.

Further, sometimes a variation occurs in the air-fuel ratios among the cylinders of the internal combustion engine (so-called "imbalance"). As a result, if the third air-fuel ratio sensor 42 is strongly affected by the exhaust gas of a specific cylinder, sometimes the output of the third air-fuel ratio sensor 42 will deviate from the average air-fuel ratio of the exhaust gas as a whole. If the target air-fuel ratio of the air-fuel mixture is changed to one leaner than the stoichiometric air-fuel ratio, the effect of the imbalance can be reduced by making the first catalyst 20 and the second catalyst 23 respectively store oxygen in the exhaust gas.

For this reason, in order to enhance the precision of diagnosis of abnormality, it is necessary to judge the abnormality of the third air-fuel ratio sensor 42 based on the output of the third air-fuel ratio sensor 42 after the oxygen storage amounts greatly change in the first catalyst 20 and the second catalyst 23. Therefore, in the present embodiment, as shown below, the amounts of change of the oxygen storage amounts of the first catalyst 20 and the second catalyst 23 are calculated and it is judged whether judgment of abnormality of the third air-fuel ratio sensor 42 is permitted based on the amounts of change of the oxygen storage amounts.

The oxygen change calculation part 73 calculates the amount of change of the oxygen storage amount of the catalyst when the air-fuel ratio control part 71 makes the air-fuel ratio of the air-fuel mixture change. If, like in the present embodiment, the downstream side air-fuel ratio detection device is arranged at the downstream side of a plurality of catalysts, the oxygen change calculation part 73 calculates the amount of change of the oxygen storage amount when the air-fuel ratio control part 71 makes the air-fuel ratio of the air-fuel mixture change for each of the plurality of catalysts. Specifically, the oxygen change calculation part 73 calculates the amount of change of the oxygen storage amount when the air-fuel ratio control part 71 makes the air-fuel ratio of the air-fuel mixture change for each of the first catalyst 20 and the second catalyst 23 arranged at the upstream side of the third air-fuel ratio sensor 42.

For example, the oxygen change calculation part 73 calculates the amount of change of the oxygen storage amount of a catalyst based on the difference of the output values of the air-fuel ratio sensors arranged at both sides of the catalyst. By doing this, it is possible to precisely calculate the amount of change of the oxygen storage amount of the catalyst. In the present embodiment, the oxygen change calculation part 73 calculates the amount of change of the oxygen storage amount of the first catalyst 20 based on the difference of the output value of the first air-fuel ratio sensor 40 and the output value of the second air-fuel ratio sensor 41, and calculates the amount of change of the oxygen storage amount of the second catalyst 23 based on the difference of the output value of the second air-fuel ratio sensor 41 and the output value of the third air-fuel ratio sensor 42.

Figure 7:
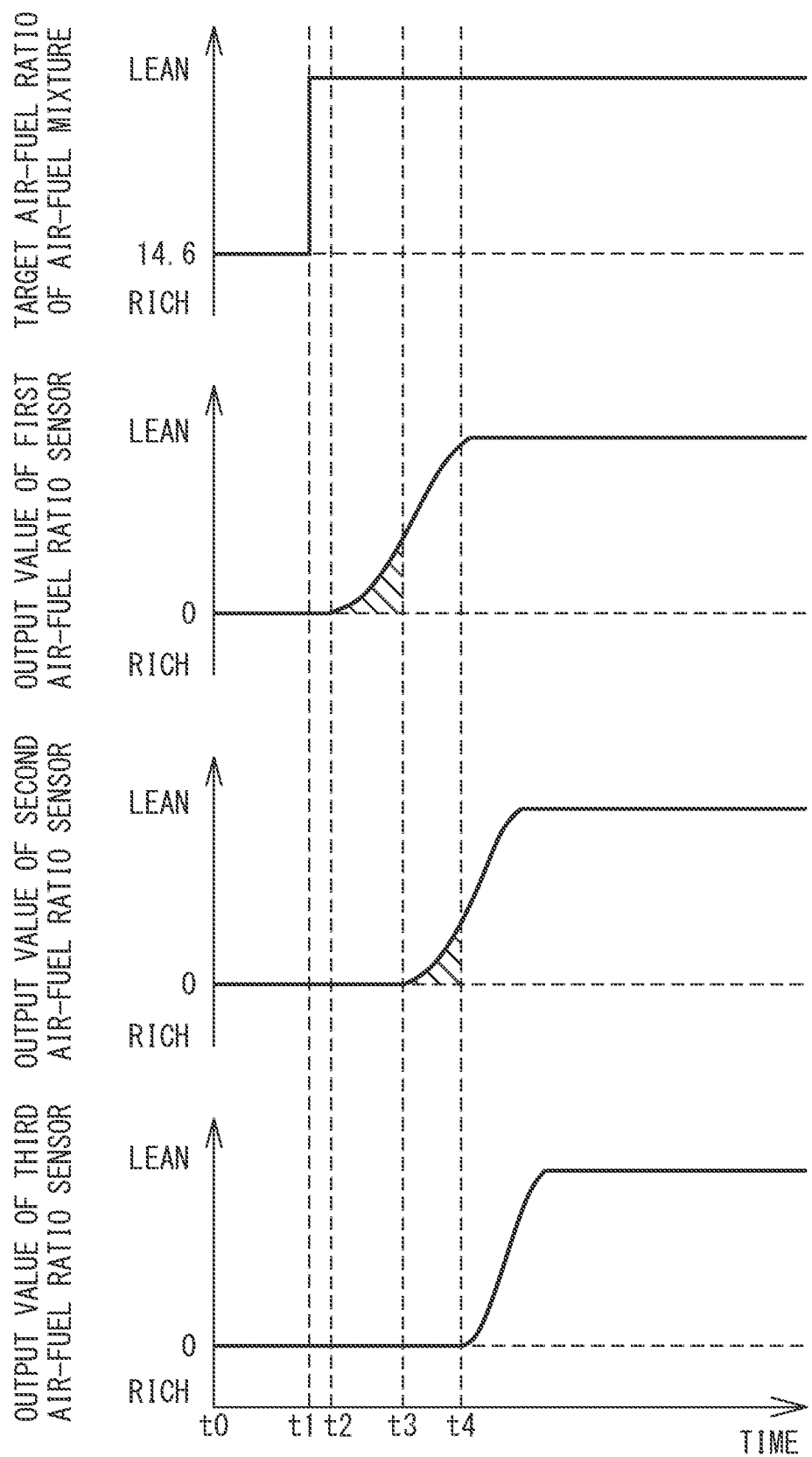
FIG. 7 is a time chart of the target air-fuel ratio of the air-fuel mixture etc., at the time of diagnosis of abnormality of the third air-fuel ratio sensor.

Below, referring to FIG. 7, the method of calculation of the oxygen storage amount of the catalyst will be specifically explained. FIG. 7 is a time chart of the target air-fuel ratio of the air-fuel mixture at the time of diagnosis of abnormality of the third air-fuel ratio sensor 42, the output value of the first air-fuel ratio sensor 40, the output value of the second air-fuel ratio sensor 41, and the output value of the third air-fuel ratio sensor 42.

In the example of FIG. 7, in the same way as the example of FIG. 6, the target air-fuel ratio of the air-fuel mixture is switched. That is, at the time t1, the target air-fuel ratio of the air-fuel mixture is switched from the stoichiometric air-fuel ratio to a value leaner than the stoichiometric air-fuel ratio. As a result, at the time t2, the output value of the first air-fuel ratio sensor 40 starts to rise.

After the time t2, the oxygen in the exhaust gas is stored in the first catalyst 20. After that, the oxygen storage amount of the first catalyst 20 reaches the vicinity of the maximum oxygen storage amount. At the time t3, the output value of the second air-fuel ratio sensor 41 starts to rise. After the time t3, the oxygen in the exhaust gas is stored in the second catalyst 23. After that, the oxygen storage amount of the second catalyst 23 reaches the vicinity of the maximum oxygen storage amount and at the time t4, the output value of the third air-fuel ratio sensor 42 starts to rise.

The amount of change of the oxygen storage amount of the first catalyst 20, that is, the amount of oxygen stored in the first catalyst 20 after the target air-fuel ratio of the air-fuel mixture is switched to a value leaner than the stoichiometric air-fuel ratio, becomes larger proportional to the difference between the output value of the first air-fuel ratio sensor 40 and the output value of the second air-fuel ratio sensor 41 from the time t2 to the time t3. Further, the amount of oxygen in the exhaust gas of the air-fuel ratio leaner than the stoichiometric air-fuel ratio, that is, the amount of oxygen stored in the first catalyst 20, becomes greater proportional to the amount of intake air.

For this reason, the oxygen change calculation part 73 cumulatively adds values of the difference between the output value of the first air-fuel ratio sensor 40 and the output value of the second air-fuel ratio sensor 41 multiplied with the amount of intake air to thereby calculate the amount of change of the oxygen storage amount of the first catalyst 20. Specifically, the oxygen change calculation part 73 calculates the amount of change OCA1 of the oxygen storage amount of the first catalyst 20 by the following formula (1).

[Mathematical 1]

$$OCA1 = \int_{t2}^{t3} \{|I1-I2|\} \times Ga\} dt \quad (1)$$

Here, I1 is the output value of the first air-fuel ratio sensor 40, I2 is the output value of the second air-fuel ratio sensor 41, and Ga is the amount of intake air. The amount of intake air Ga is calculated based on the output of the air flow meter 39.

The time t2 is the time when the output value of the first air-fuel ratio sensor 40 is starting to change toward the target air-fuel ratio. For example, it is set to the time when the output value of the first air-fuel ratio sensor 40 reaches a value corresponding to a lean judged air-fuel ratio slightly leaner than the stoichiometric air-fuel ratio. The time t3 is the time when the output value of the second air-fuel ratio sensor 41 starts to change toward the target air-fuel ratio. For example, it is set to the time when the output value of the second air-fuel ratio sensor 41 reaches a value corresponding to the lean judged air-fuel ratio. The lean judged air-fuel ratio is determined in advance and is for example set to 14.65.

The amount of change of the oxygen storage amount of the second catalyst 23, that is, the amount of oxygen stored in the second catalyst 23 after the target air-fuel ratio of the air-fuel mixture is switched to a value leaner than the stoichiometric air-fuel ratio, becomes larger proportional to the difference between the output value of the second air-fuel ratio sensor 41 and the output value of the third air-fuel ratio sensor 42 from the time t3 to the time t4. Further, the amount of the oxygen in the exhaust gas of an air-fuel ratio leaner than the stoichiometric air-fuel ratio, that is, the amount of oxygen stored in the second catalyst 23, becomes greater proportional to the amount of intake air.

For this reason, the oxygen change calculation part 73 cumulatively adds values of the difference between the output value of the second air-fuel ratio sensor 41 and the output value of the third air-fuel ratio sensor 42 multiplied with the amount of intake air to thereby calculate the amount of change of the oxygen storage amount of the second catalyst 23. Specifically, the oxygen change calculation part 73 calculates the amount of change OCA2 of the oxygen storage amount of the second catalyst 23 by the following formula (2).

[Mathematical 2]

$$OCA2 = \int_{t3}^{t4} \{|I2-I3|\} \times Ga\} dt \quad (2)$$

Here, I2 is the output value of the second air-fuel ratio sensor 41, I3 is the output value of the third air-fuel ratio sensor 42, and Ga is the amount of intake air. The amount of intake air Ga is calculated based on the output of the air flow meter 39.

The time t3 is the time when the output value of the second air-fuel ratio sensor 41 starts to change toward the target air-fuel ratio. For example, it is set to the time when the output value of the second air-fuel ratio sensor 41 reaches a value corresponding to the lean judged air-fuel ratio. The time t4 is the time when the output value of the third air-fuel ratio sensor 42 is starting to change toward the target air-fuel ratio. For example, it is set to the time when the output value of the third air-fuel ratio sensor 42 reaches a value corresponding to the lean judged air-fuel ratio.

Note that, in the above formulas (1) and (2), instead of the amount of intake air Ga, another parameter correlated with the amount of intake air may be used. Examples of other parameters include the engine load, output torque of the internal combustion engine, cylinder pressure, amounts of fuel injection, etc. The engine load is, for example, calculated based on the output of the load sensor 44. The output torque is, for example, detected by a torque sensor arranged at the output shaft (crankshaft) of the internal combustion engine or is calculated based on the engine load, opening degree of the throttle valve 18, cylinder pressure, etc. The cylinder pressure is, for example, detected by a cylinder pressure sensor arranged inside a cylinder. The amounts of fuel injection are, for example, calculated based on a command value from the ECU 31 to the fuel injectors 11.

Further, as the output value I1 of the first air-fuel ratio sensor 40, the output value I2 of the second air-fuel ratio sensor 41, and the output value I3 of the third air-fuel ratio sensor 42, instead of the values of the output currents, the values of air-fuel ratios corresponding to the output currents, that is, output air-fuel ratios, may be used.

Further, in the above formula (1), instead of the time t2, the time t1 at which the target air-fuel ratio of the air-fuel mixture is switched from the stoichiometric air-fuel ratio to the target air-fuel ratio may be used. In this case, in the above formula (1), instead of the output value I1 of the first air-fuel ratio sensor 40, a value of the output current corresponding to the target air-fuel ratio of the air-fuel mixture or the target air-fuel ratio of the air-fuel mixture may be used. In this case, the first air-fuel ratio sensor 40 may be omitted from the abnormality diagnosis system 1.

Further, in the above formula (2), instead of the time t3, the time t1 at which the target air-fuel ratio of the air-fuel mixture is switched from the stoichiometric air-fuel ratio to the target air-fuel ratio may be used.

The abnormality judgment part 72 does not judge abnormality of the downstream side air-fuel ratio detection device (in the present embodiment, the third air-fuel ratio sensor 42) when the amount of change of the oxygen storage amount of at least one catalyst of the plurality of catalysts (in the present embodiment, the first catalyst 20 and the second catalyst 23) is less than a lower limit threshold value. On the other hand, the abnormality judgment part 72 judges abnormality of the downstream side air-fuel ratio detection device when the amounts of change of the oxygen storage amounts of the plurality of catalysts are equal to or more than the lower limit threshold value. By doing this, it is possible to raise the reliability of diagnosis of abnormality of the downstream side air-fuel ratio detection device.

Figure 8:
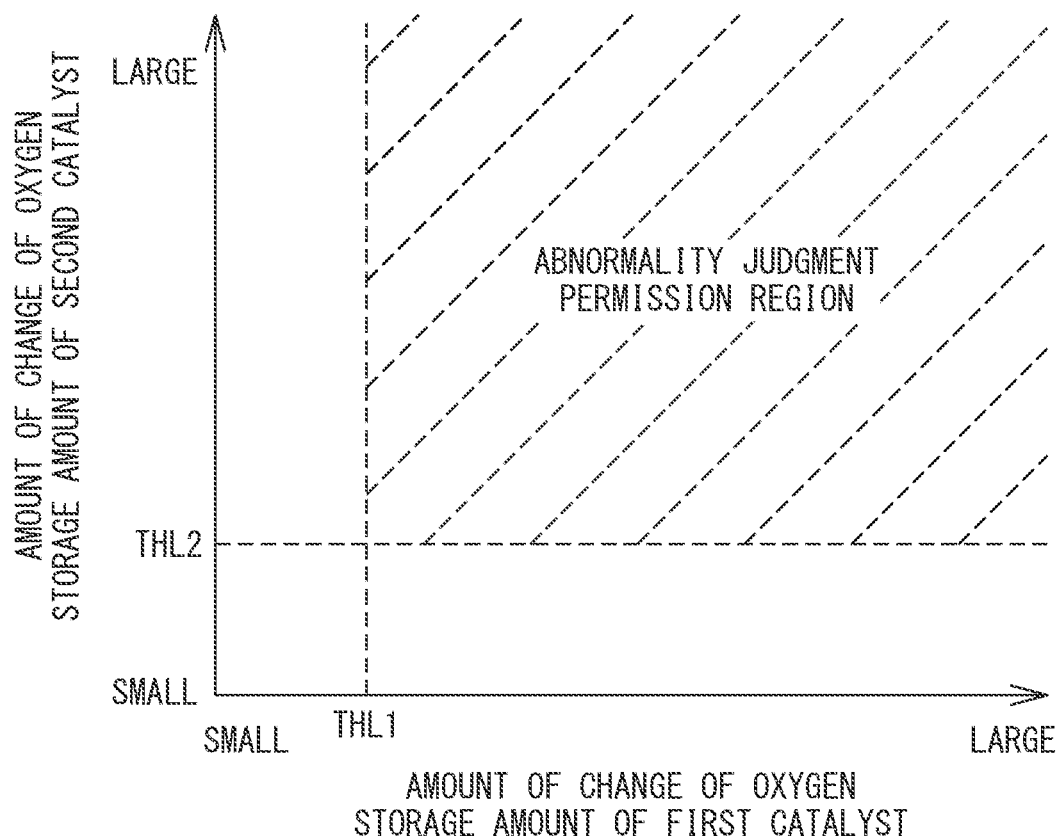
FIG. 8 is a view showing a region in which judgment of abnormality of the third air-fuel ratio sensor in the first embodiment is permitted.

FIG. 8 is a view showing a region in which judgment of abnormality of the third air-fuel ratio sensor 42 is permitted in the first embodiment. In FIG. 8, THL1 is the lower limit threshold value for the first catalyst 20, while THL2 is the lower limit threshold value for the second catalyst 23. As shown in FIG. 8, when the amount of change of the oxygen storage amount of the first catalyst 20 is equal to or more than the lower limit value THL1 and the amount of change of the oxygen storage amount of the second catalyst 23 is equal to or more than the lower limit threshold value THL2, judgment of abnormality of the third air-fuel ratio sensor 42 is permitted.

<Processing of Judgment of Abnormality>

Figure 9:
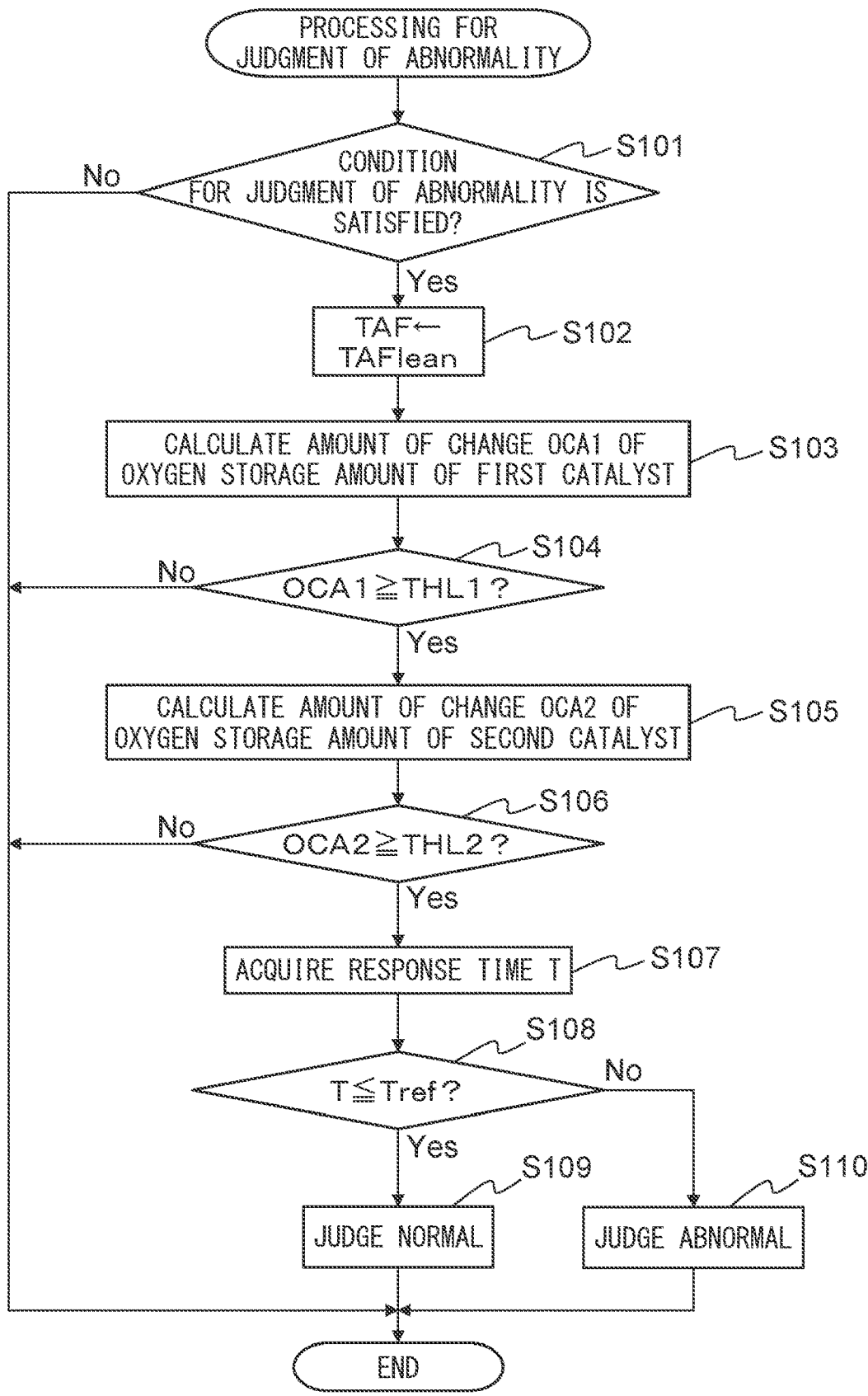
FIG. 9 is a flow chart showing a control routine of processing for judgment of abnormality in the first embodiment.

Below, referring to the flow chart of FIG. 9, in the present embodiment, control for judgment of abnormality of the third air-fuel ratio sensor 42 will be explained. FIG. 9 is a flow chart showing a control routine of the processing for judgment of abnormality in the first embodiment. The present control routine is repeatedly performed by the ECU 31 after startup of the internal combustion engine.

First, at step S101, the air-fuel ratio control part 71 judges whether the condition for judgment of abnormality is satisfied. The condition for judgment of abnormality is satisfied if for example a predetermined time has elapsed after the startup of the internal combustion engine and abnormality of the third air-fuel ratio sensor 42 has still not been judged after startup of the internal combustion engine. Note that, the condition for judgment of abnormality may be the temperatures of the first catalyst 20 and the second catalyst 23 being equal to or more than predetermined activation temperatures, the temperatures of the first air-fuel ratio sensor 40, the second air-fuel ratio sensor 41, and the third air-fuel ratio sensor 42 being equal to or more than predetermined activation temperatures, the engine speed being within a predetermined range, the engine load being within a predetermined range, etc.

If at step S101 it is judged that the condition for judgment of abnormality is not satisfied, the present control routine ends. On the other hand, if at step S101 it is judged that the condition for judgment of abnormality is satisfied, the present control routine proceeds to step S102.

At step S102, the air-fuel ratio control part 71 makes the air-fuel ratio of the air-fuel mixture leaner than the stoichiometric air-fuel ratio. Specifically, the air-fuel ratio control part 71 sets the target air-fuel ratio of the air-fuel mixture to a lean set air-fuel ratio leaner than the stoichiometric air-fuel ratio and controls the amounts of fuel injection of the fuel injectors 11 so that the air-fuel ratio of the air-fuel mixture matches the target air-fuel ratio. The lean set air-fuel ratio is determined in advance and is, for example, set to 14.8 to 16.6.

Next, at step S103, the oxygen change calculation part 73 calculates the amount of change OCA1 of the oxygen storage amount of the first catalyst 20.

Next, at step S104, the abnormality judgment part 72 judges whether the amount of change OCA1 of the oxygen storage amount of the first catalyst 20 is equal to or more than the lower limit threshold value THL1. The lower limit threshold value THL1 is determined in advance and is, for example, set to equal to or more than a value of ⅕ of the maximum oxygen storage amount of an unused (new) first catalyst 20.

If at step S104 it is judged that the amount of change OCA1 of the oxygen storage amount of the first catalyst 20 is less than the lower limit threshold value THL1, the present control routine ends. In this case, abnormality of the third air-fuel ratio sensor 42 is not judged. In other words, judgment of abnormality of the third air-fuel ratio sensor 42 is prohibited.

On the other hand, if at step S104 it is judged that the amount of change OCA1 of the oxygen storage amount of the first catalyst 20 is equal to or more than the lower limit threshold value THL1, the present control routine proceeds to step S105. At step S105, the oxygen change calculation part 73 calculates the amount of change OCA2 of the oxygen storage amount of the second catalyst 23.

Next, at step S106, the abnormality judgment part 72 judges whether the amount of change OCA2 of the oxygen storage amount of the second catalyst 23 is equal to or more than the lower limit threshold value THL2. The lower limit threshold value THL2 is determined in advance and is, for example, set to equal to or more than a value of ⅕ of the maximum oxygen storage amount of an unused (new)

second catalyst 23. The lower limit threshold value THL2 may be the same as the upper limit threshold value THL1 or may be different.

If at step S106 it is judged that the amount of change OCA2 of the oxygen storage amount of the second catalyst 23 is less than the lower limit threshold value THL2, the present control routine ends. In this case, abnormality of the third air-fuel ratio sensor 42 is not judged. In other words, judgment of abnormality of the third air-fuel ratio sensor 42 is prohibited.

On the other hand, if at step S106 it is judged that the amount of change OCA2 of the oxygen storage amount of the second catalyst 23 is equal to or more than the lower limit threshold value THL2, the present control routine proceeds to step S107. At step S107, the abnormality judgment part 72 acquires the response time T as the time period during which the output of the third air-fuel ratio sensor 42 passes a predetermined output section. The predetermined output section is determined in advance and is set to a range leaner than the stoichiometric air-fuel ratio.

Next, at step S108, the abnormality judgment part 72 judges whether the response time T is equal to or less than the reference value Tref. The reference value Tref is determined in advance by experiments, calculations, etc.

If at step S108 it is judged that the response time T is equal to or less than the reference value Tref, the present control routine proceeds to step S109. At step S109, the abnormality judgment part 72 judges that the response characteristic of the third air-fuel ratio sensor 42 is normal. After step S109, the present control routine ends.

On the other hand, if at step S108 it is judged that the response time T is longer than the reference value T, the present control routine proceeds to step S110. At step S110, the abnormality judgment part 72 judges that the response characteristic of the third air-fuel ratio sensor 42 is abnormal and turns on a warning light provided at the vehicle mounting the internal combustion engine. After step S110, the present control routine ends.

Note that, at step S107, it is also possible that the slant of the output of the third air-fuel ratio sensor 42 when the output passes the predetermined output section be acquired and at step S108 it be judged whether the slant of the output is equal to or more than a reference value.

Further, if fuel cut control for stopping the injection of fuel by the fuel injectors 11 is performed, air is supplied to the exhaust passage and the air-fuel ratio of the air-fuel mixture becomes leaner than the stoichiometric air-fuel ratio. For this reason, the abnormality judgment part 72 may judge abnormality of the third air-fuel ratio sensor 42 based on the characteristic of change of output of the third air-fuel ratio sensor 42 when the air-fuel ratio control part 71 makes the air-fuel ratio of the air-fuel mixture change by fuel cut control. In this case, at step S102, the abnormality judgment part 72 judges whether fuel cut control has been performed. If it is judged that fuel cut control has been performed, the present control routine proceeds to step S103.

Further, if the judgment at step S104 or step S106 is negative, the air-fuel ratio control part 71 may temporarily make the air-fuel ratio of the air-fuel mixture richer than the stoichiometric air-fuel ratio so as to reduce the oxygen storage amounts of the first catalyst 20 and the second catalyst 23.

Second Embodiment

The abnormality diagnosis system according to the second embodiment is basically the same in configuration and control to the abnormality diagnosis system according to the first embodiment except for the points explained below. For this reason, below, the second embodiment of the present invention will be explained centered on parts different from the first embodiment.

In the second embodiment, the second catalyst 23 is configured as a four-way catalyst having a filter function for trapping the particulate matter (PM) in the exhaust gas. The four-way catalyst can simultaneously remove HC, CO, and NOx by the catalytic action and can trap the PM by the filter function.

Figure 10:
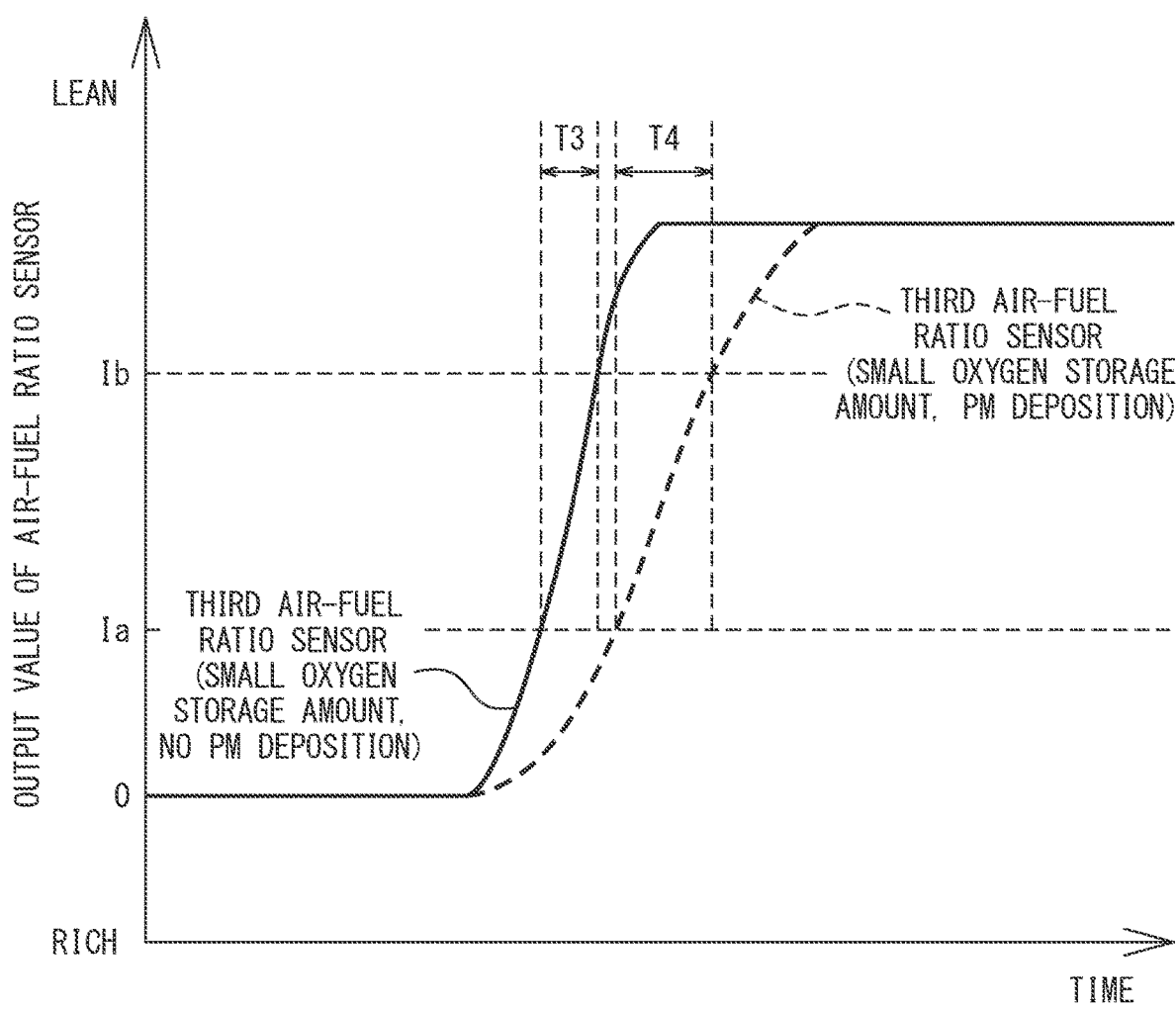
FIG. 10 is a time chart of the output value of a third air-fuel ratio sensor when making the target air-fuel ratio of the air-fuel mixture change.

The inventors of the present application engaged in intensive studies and as a result discovered that in a four-way catalyst, the state of deposition of PM on the catalyst affects the change of output of the third air-fuel ratio sensor 42. FIG. 10 is a time chart of the output value of the third air-fuel ratio sensor 42 when the target air-fuel ratio of the air-fuel mixture is made to change. In FIG. 10, the output value of the third air-fuel ratio sensor 42 when the oxygen storage amount of the second catalyst 23 at the time of start of diagnosis of abnormality is small and PM has not deposited on the second catalyst 23 is shown by the solid line. Further, the output value of the third air-fuel ratio sensor 42 when the oxygen storage amount of the second catalyst 23 at the time of start of diagnosis of abnormality is small and PM has deposited on the second catalyst 23 is shown by the broken line.

In the example of FIG. 10, in the same way as the example of FIG. 6, the target air-fuel ratio of the air-fuel mixture is switched. As shown in FIG. 10, if PM has deposited on the second catalyst 23, compared to when PM has not deposited on the second catalyst 23, the change of the output value of the third air-fuel ratio sensor 42 becomes later. As a result, the response time T4 when PM deposits on the second catalyst 23 becomes longer than the response time T3 when PM has not deposited on the second catalyst 23.

This is believed to be because the local deposition of PM affects the air-fuel ratio of the exhaust gas flowing out from the second catalyst 23 after storage of oxygen. Note that, such a phenomenon does not occur if the oxygen storage amount of the second catalyst 23 is large at the time of start of diagnosis of abnormality.

For this reason, if the oxygen storage amount of the second catalyst 23 which is a four-way catalyst is small, even when the third air-fuel ratio sensor 42 is normal, it is liable to be judged that the response characteristic of the third air-fuel ratio sensor 42 has deteriorated. That is, if the oxygen storage amount of the second catalyst 23 which is a four-way catalyst is small, abnormality of the third air-fuel ratio sensor 42 is liable to be misjudged.

For this reason, in the second embodiment, the abnormality judgment part 72 does not judge abnormality of the third air-fuel ratio sensor 42 when the amount of change of the oxygen storage amount of the second catalyst 23 is larger than the upper limit threshold value. By doing this, if the second catalyst 23 is a four-way catalyst, it is possible to keep the reliability of diagnosis of abnormality of the third air-fuel ratio sensor 42 from falling.

Figure 11:
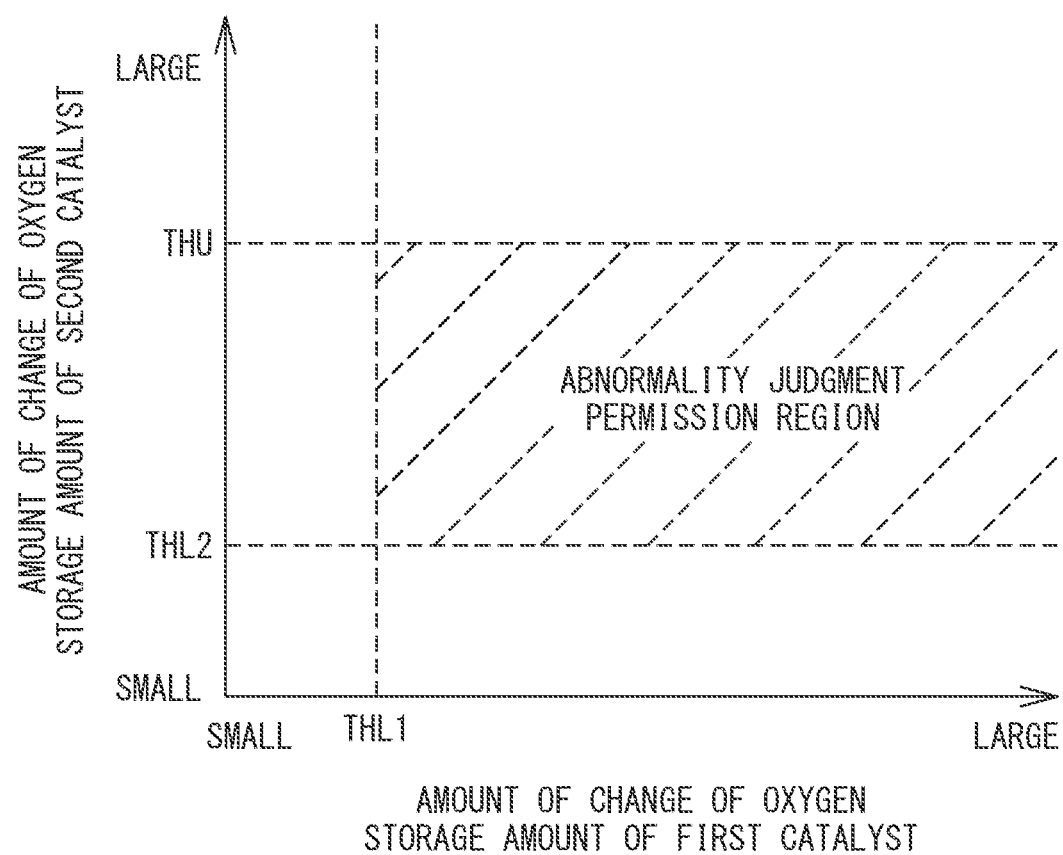
FIG. 11 is a view showing a region in which judgment of abnormality of the third air-fuel ratio sensor in the second embodiment is permitted.

FIG. 11 is a view showing a region in which judgment of abnormality of the third air-fuel ratio sensor 42 is permitted in the second embodiment. In FIG. 11, THL1 is the lower limit threshold value for the first catalyst 20, THL2 is the lower limit threshold value for the second catalyst 23, and THU is the upper limit threshold value for the second catalyst 23. As shown in FIG. 11, judgment of abnormality of the third air-fuel ratio sensor 42 is permitted when the amount of change of the oxygen storage amount of the first catalyst 20 is equal to or more than the lower limit value THL1 and the amount of change of the oxygen storage amount of the second catalyst 23 is equal to or more than the lower limit threshold value THL and equal to or less than the upper limit threshold value THU.

Further, if the PM burns at the second catalyst 23, combustion gas is mixed with the exhaust gas flowing out from the second catalyst 23 and the output value of the third air-fuel ratio sensor 42 falls (becomes rich). For this reason, even if the PM burns, abnormality of the third air-fuel ratio sensor 42 is liable to be misjudged.

Therefore, in the second embodiment, the abnormality judgment part 72 does not judge abnormality of the third air-fuel ratio sensor 42 if judging that the PM has burned at the second catalyst 23 when the air-fuel ratio control part 71 makes the air-fuel ratio of the air-fuel mixture change. By doing this, if the second catalyst 23 is a four-way catalyst, it is possible to better keep the reliability of diagnosis of abnormality of the third air-fuel ratio sensor 42 from falling.

<Processing for Judgment of Abnormality>

Figure 12:
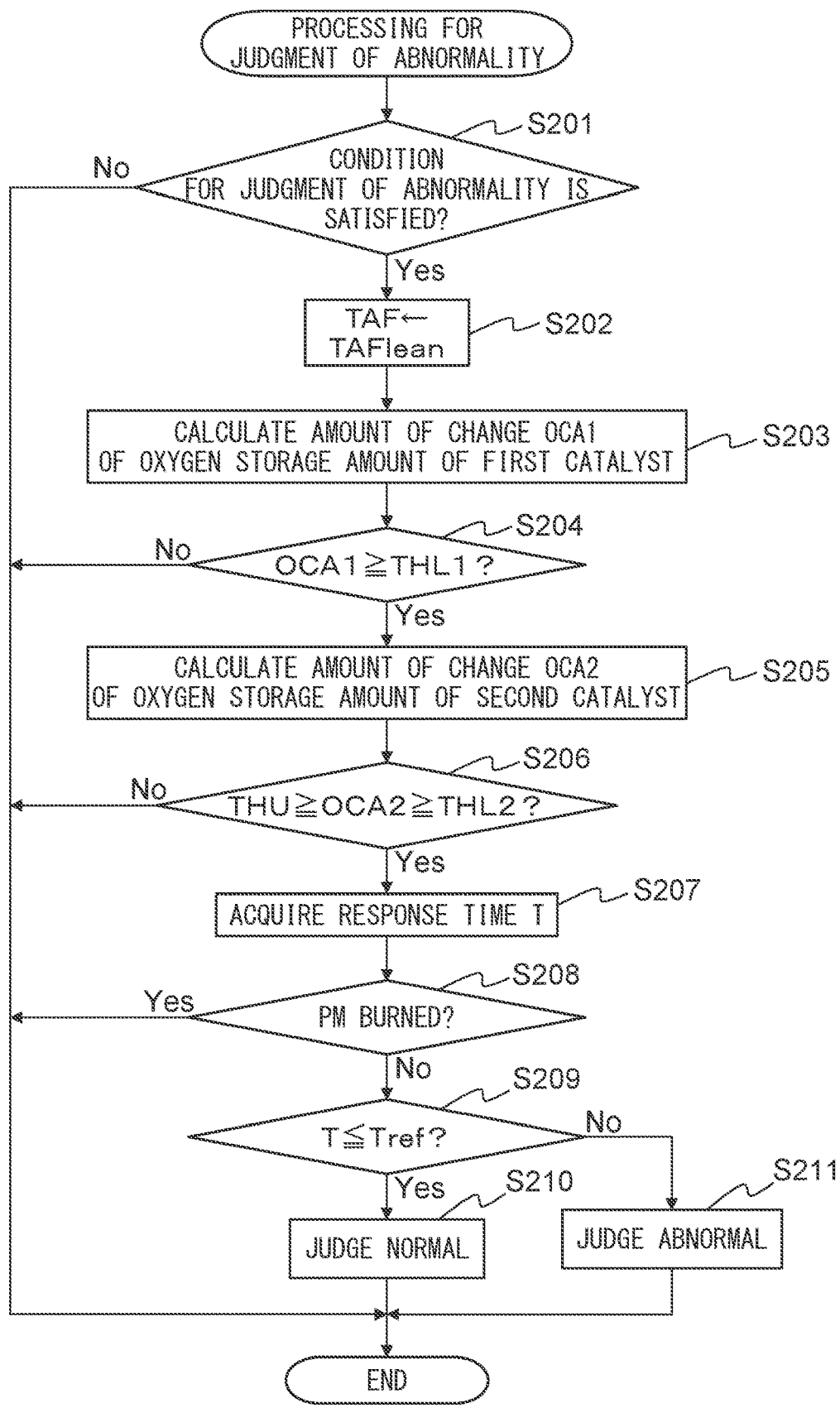
FIG. 12 is a flow chart showing a control routine of processing for judgment of abnormality in the second embodiment.

FIG. 12 is a flow chart showing a control routine of the processing for judgment of abnormality in the second embodiment. The present control routine is repeatedly performed by the ECU 31 after startup of the internal combustion engine.

Step S201 to step S205 are performed in the same way as step S101 to step S105 of FIG. 9. After step S205, at step S206, the abnormality judgment part 72 judges whether the amount of change OCA2 of the oxygen storage amount of the second catalyst 23 is equal to or more than the lower limit threshold value THL2 and equal to or less than the upper limit threshold value THU. The upper limit threshold value THU is determined in advance and is set to a value larger than the lower limit threshold value THL2. The upper limit threshold value THU is, for example, set to equal to or more than a value of ½ of the maximum oxygen storage amount of the unused (new) second catalyst 23.

If at step S206 it is judged that the amount of change OCA2 of the oxygen storage amount of the second catalyst 23 is less than the lower limit threshold value THL2 or is larger than the upper limit value THU, the present control routine ends. In this case, abnormality of the third air-fuel ratio sensor 42 is not judged. In other words, judgment of abnormality of the third air-fuel ratio sensor 42 is prohibited.

On the other hand, if at step S206 it is judged that the amount of change OCA2 of the oxygen storage amount of the second catalyst 23 is equal to or more than the lower limit threshold value THL2 and equal to or less than the upper limit threshold value THU, the present control routine proceeds to step S207. At step S207, in the same way as step S107 of FIG. 9, the abnormality judgment part 72 acquires the response time T.

Next, at step S208, the abnormality judgment part 72 judges whether PM has burned at the second catalyst 23 when the air-fuel ratio control part 71 makes the air-fuel ratio of the air-fuel mixture change. For example, the abnormality judgment part 72 judges that the PM has burned at the second catalyst 23 if the average temperature of the second catalyst 23 in the period from when the target air-fuel ratio of the air-fuel mixture is set to the lean set air-fuel ratio TAFlean to when the output of the third air-fuel ratio sensor 42 passes a predetermined output section is equal to or more than a predetermined temperature.

The temperature of the second catalyst 23 is, for example, detected by a temperature sensor arranged at the second catalyst 23. Note that, the temperature of the second catalyst 23 may be calculated based the output of a temperature sensor detecting the temperature of the exhaust gas flowing into the second catalyst 23 or the temperature of the exhaust gas flowing out from the second catalyst 23. Further, the temperature of the second catalyst 23 may be calculated based on a predetermined operating parameter of the internal combustion engine (cumulative amount of intake air etc.).

If at step S208 it is judged that the PM has been burned at the second catalyst 23, the present control routine ends. In this case, abnormality of the third air-fuel ratio sensor 42 is not judged. In other words, judgment of abnormality of the third air-fuel ratio sensor 42 is prohibited.

On the other hand, if at step S208 it is judged that PM has not been burned at the second catalyst 23, the present control routine proceeds to step S209. Step S209 to step S211 are performed in the same way as step S108 to step S110 of FIG. 9. Note that, the present control routine can be modified in the same way as the control routine of FIG. 9.

Further, in the second embodiment, in addition to the second catalyst 23 or instead of the second catalyst 23, the first catalyst 20 may be configured as a four-way catalyst. In this case, at step S204, the abnormality judgment part 72 judges whether the amount of change OCA1 of the oxygen storage amount of the first catalyst 20 is equal to or more than the lower limit threshold value THL1 and equal to or less than the upper limit threshold value THU. The upper limit threshold value THU is determined in advance and is set to a value larger than the lower limit threshold value THL1.

Third Embodiment

The abnormality diagnosis system according to the third embodiment is basically the same in configuration and control to the abnormality diagnosis system according to the first embodiment except for the points explained below. For this reason, below, the third embodiment of the present invention will be explained centered on parts different from the first embodiment.

In the third embodiment, when abnormality of the third air-fuel ratio sensor 42 is diagnosed, the air-fuel ratio control part 71 makes the air-fuel ratio of the air-fuel mixture richer than the stoichiometric air-fuel ratio. Specifically, the air-fuel ratio control part 71 switches the target air-fuel ratio of the air-fuel mixture from the stoichiometric air-fuel ratio to a value richer than the stoichiometric air-fuel ratio.

Figure 13:
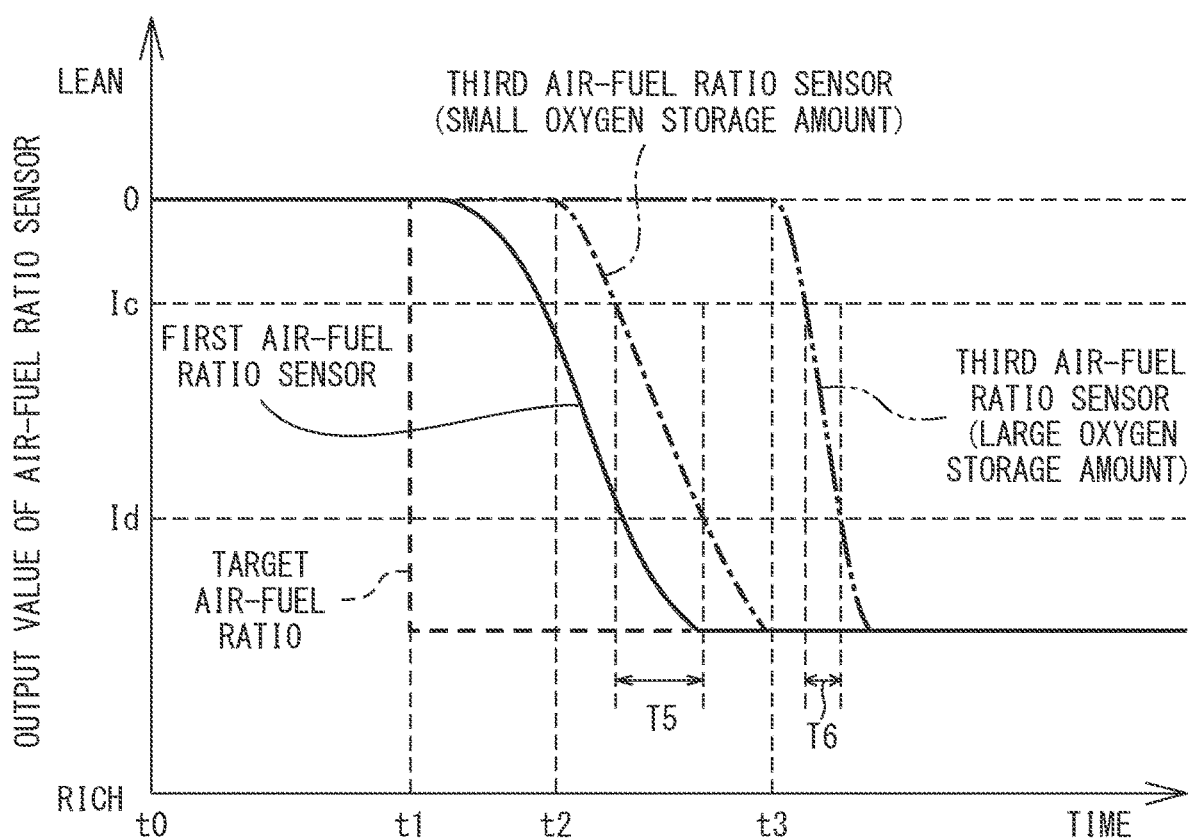
FIG. 13 is a time chart of an output value of a first air-fuel ratio sensor and an output value of a third air-fuel ratio sensor when making the target air-fuel ratio of the air-fuel mixture change.

FIG. 13 is a time chart of the output value of the first air-fuel ratio sensor 40 and the output value of the third air-fuel ratio sensor 42 when making the target air-fuel ratio of the air-fuel mixture change. In FIG. 13, the target air-fuel ratio of the air-fuel mixture is shown by the broken line and the output value of the first air-fuel ratio sensor 40 is shown by the solid line. Further, in FIG. 13, the output value of the third air-fuel ratio sensor 42 if the oxygen storage amounts of the first catalyst 20 and the second catalyst 23 at the time of start of the diagnosis of abnormality are small is shown by the one-dot chain line, while the output value of the third air-fuel ratio sensor 42 if the oxygen storage amounts of the first catalyst 20 and the second catalyst 23 at the time of start of the diagnosis of abnormality are large is shown by the two-dot chain line.

In the example of FIG. 13, unlike the example of FIG. 6, at the time t1, for diagnosis of abnormality, the target air-fuel ratio of the air-fuel mixture is switched from the stoichiometric air-fuel ratio to a value richer than the stoichiometric air-fuel ratio. Along with this, after the time t1 the output value of the first air-fuel ratio sensor 40 changes toward the target air-fuel ratio. At this time, since time is required for the exhaust gas to be switched, the output value of the first air-fuel ratio sensor 40 changes later than the change of the target air-fuel ratio.

On the other hand, at the third air-fuel ratio sensor 42, the exhaust gas passing through the first catalyst 20 and the second catalyst 23 flows in. When the oxygen storage amounts of the first catalyst 20 and the second catalyst 23 are suitable values, due to the release of oxygen, the atmosphere of the catalyst 20 is made to approach the stoichiometric air-fuel ratio. As a result, the HC and CO in the exhaust gas are removed at the first catalyst 20 and the second catalyst 23 and the output value of the third air-fuel ratio sensor 42 is maintained at the stoichiometric air-fuel ratio.

The greater the oxygen storage amounts of the first catalyst 20 and the second catalyst 23, the greater the amounts of oxygen able to be released from the first catalyst 20 and the second catalyst 23 when the air-fuel ratio of the exhaust gas is richer than the stoichiometric air-fuel ratio. For this reason, the time period during which the output value of the third air-fuel ratio sensor 42 is maintained at the stoichiometric air-fuel ratio becomes longer the greater the oxygen storage amounts of the first catalyst 20 and the second catalyst 23 at the time of start of the diagnosis of abnormality.

If the oxygen storage amounts of the first catalyst 20 and the second catalyst 23 at the time of start of the diagnosis of abnormality are small, the time until the oxygen storage amounts of the first catalyst 20 and the second catalyst 23 become zero becomes shorter. As a result, at the time t2, the output value of the third air-fuel ratio sensor 42 starts to change toward the target air-fuel ratio. At this time, the output value of the first air-fuel ratio sensor 40 still has not reached the target air-fuel ratio. For this reason, the change of the output value of the third air-fuel ratio sensor 42 becomes later.

On the other hand, if the oxygen storage amounts of the first catalyst 20 and the second catalyst 23 at the time of start of the diagnosis of abnormality are large, the time period until the oxygen storage amounts of the first catalyst 20 and the second catalyst 23 reaches zero becomes longer. As a result, at the time t3 after the time t2, the output value of the third air-fuel ratio sensor 42 starts to change toward the target air-fuel ratio. At this time, the output value of the first air-fuel ratio sensor 40 has already reached the target air-fuel ratio. For this reason, the change of the output value of the third air-fuel ratio sensor 42 becomes earlier.

As shown in FIG. 13, if the oxygen storage amounts of the first catalyst 20 and the second catalyst 23 at the time of start of the diagnosis of abnormality are small, the time when the output of the third air-fuel ratio sensor 42 passes a predetermined output section (in the example of FIG. 13, Ic to Id) becomes T5. On the other hand, if the oxygen storage amounts of the first catalyst 20 and the second catalyst 23 at the time of start of the diagnosis of abnormality are large, the time when the output of the third air-fuel ratio sensor 42 passes a predetermined output section becomes T6. The time T5 when the oxygen storage amounts of the first catalyst 20 and the second catalyst 23 are small is longer than the time T6 if the oxygen storage amounts of the first catalyst 20 and the second catalyst 23.

For this reason, if the oxygen storage amounts of the first catalyst 20 and the second catalyst 23 are small, even when the third air-fuel ratio sensor 42 is normal, it is liable to be judged that the response characteristic of the third air-fuel ratio sensor 42 is deteriorating. Therefore, if the oxygen storage amounts of the first catalyst 20 and the second catalyst 23 are small, that is, if the amounts of change of the oxygen storage amounts of the first catalyst 20 and the second catalyst 23 when making the air-fuel ratio of the air-fuel mixture change to the rich side are small, abnormality of the third air-fuel ratio sensor 42 is liable to be misjudged. Further, if the target air-fuel ratio of the air-fuel mixture is changed to one richer than the stoichiometric air-fuel ratio, the effect of the imbalance can be reduced by making the first catalyst 20 and the second catalyst 23 releasing the oxygen in the exhaust gas.

For this reason, in the same way as the first embodiment, when the amount of change of the oxygen storage amount of at least one catalyst of the plurality of catalysts (in the present embodiment, the first catalyst 20 and the second catalyst 23) is less than the lower limit threshold value, the abnormality judgment part 72 does not judge abnormality of the downstream side air-fuel ratio detection device (in the present embodiment, the third air-fuel ratio sensor 42). On the other hand, when the amount of change of the oxygen storage amount for the plurality of catalysts is equal to or more than the lower limit threshold value, the abnormality judgment part 72 judges abnormality of the downstream side air-fuel ratio detection device. Due to this, it is possible to improve the reliability of the diagnosis of abnormality of the downstream side air-fuel ratio detection device.

In the third embodiment, it is possible to calculate the amount of change OCA1 of the oxygen storage amount of the first catalyst 20 by the above formula (1) and calculate the amount of change OCA2 of the oxygen storage amount of the second catalyst 23 by the above formula (2). Note that, in the first embodiment, the amount of change of the oxygen storage amount of the catalyst corresponds to the amount of oxygen stored in the catalyst, while in the third embodiment, the amount of change of the oxygen storage amount of the catalyst corresponds to the amount of oxygen released from the catalyst.

In the third embodiment, in the above formula (1), the time t2 is, for example, set to the time when the output value of the first air-fuel ratio sensor 40 reaches a value corresponding to a rich judged air-fuel ratio slightly richer than the stoichiometric air-fuel ratio. Further, at the above formulas (1) and (2), the time t3 is, for example, set to the time when the output value of the second air-fuel ratio sensor 41 reaches a value corresponding to the rich judged air-fuel ratio. Further, in the above formulas (2), the time t4 is, for example, set to the time when the output value of the third air-fuel ratio sensor 42 reaches a value corresponding to the rich judged air-fuel ratio. The rich judged air-fuel ratio is determined in advance and, for example, is set to 14.5.5.

<Processing for Judgment of Abnormality>

Figure 14:
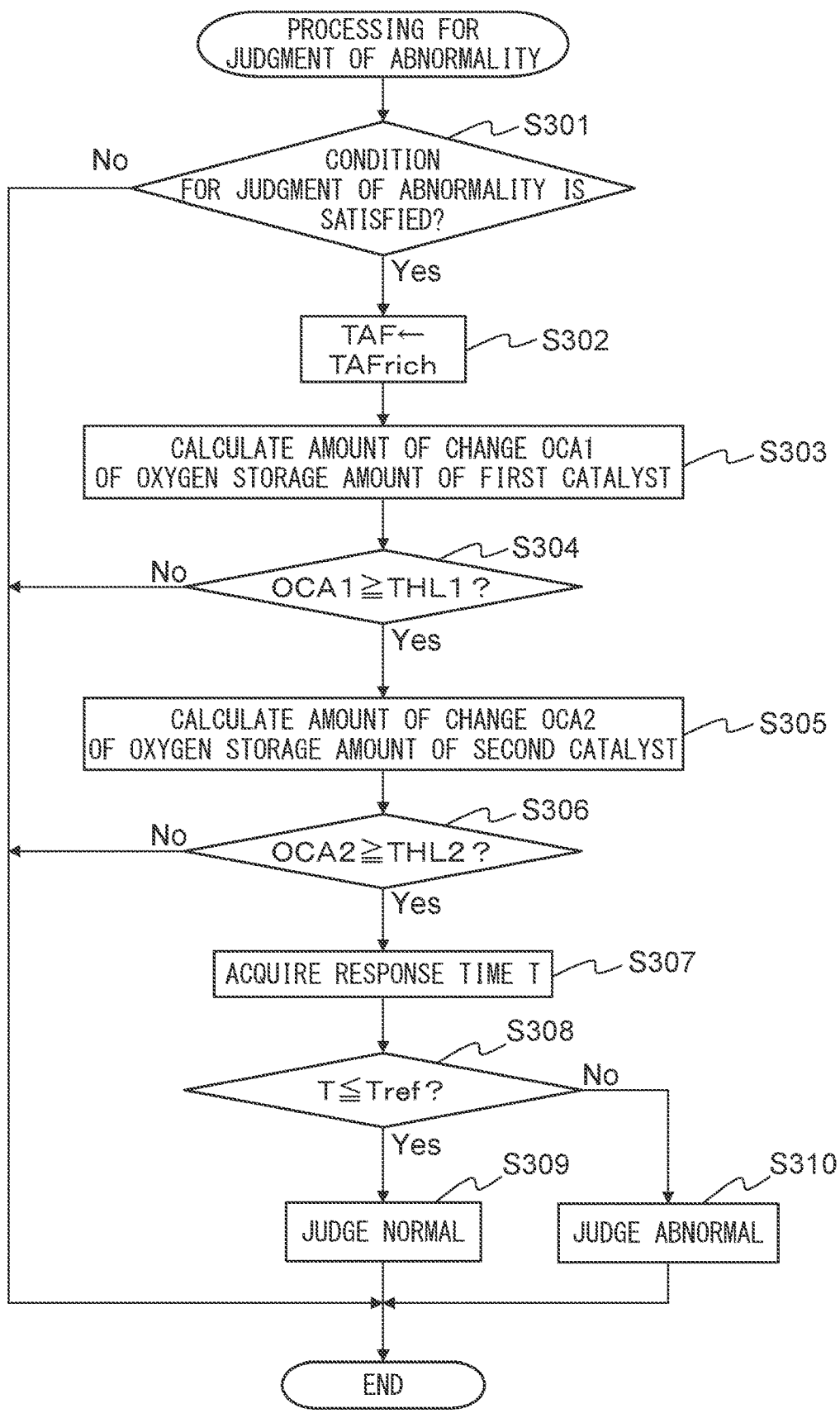
FIG. 14 is a flow chart showing a control routine of processing for judgment of abnormality in the third embodiment.

FIG. 14 is a flow chart showing a control routine of the processing for judgment of abnormality in the third embodiment. The present control routine is repeatedly performed by the ECU 31 after startup of the internal combustion engine.

First, at step S301, in the same way as step S101 of FIG. 9, the air-fuel ratio control part 71 judges whether the condition for judgment of abnormality is satisfied. If it is judged that the condition for judgment of abnormality is not satisfied, the present control routine ends. On the other hand, if at step S301 it is judged that the condition for judgment of abnormality is satisfied, the present control routine proceeds to step S302.

At step S302, the air-fuel ratio control part 71 makes the air-fuel ratio of the air-fuel mixture richer than the stoichiometric air-fuel ratio. Specifically, the air-fuel ratio control part 71 sets the target air-fuel ratio of the air-fuel mixture to a rich set air-fuel ratio richer than the stoichiometric air-fuel ratio and controls the amounts of fuel injection of the fuel injectors 11 so that the air-fuel ratio of the air-fuel mixture matches the target air-fuel ratio. The rich set air-fuel ratio is determined in advance and for example is set to 12.6 to 14.4.

Step S303 to step S310 are performed in the same way as step S103 to step S110 of FIG. 9. At this time, the predetermined output section when acquiring the response time T at step S307 is set to a range richer than the stoichiometric air-fuel ratio.

Note that, at step 305, the slant of the output when the output of the third air-fuel ratio sensor 42 passes a predetermined output section may be acquired and at step S308 it may be judged whether the absolute value of the slant of the output is equal to or more than a reference value.

Further, if the judgment at step S304 or step S306 is negative, the air-fuel ratio control part 71 may temporarily make the air-fuel ratio of the air-fuel mixture leaner than the stoichiometric air-fuel ratio so as to make the oxygen storage amount of the first catalyst 20 and the second catalyst 23 increase.

Fourth Embodiment

The abnormality diagnosis system according to the fourth embodiment is basically the same in configuration and control to the abnormality diagnosis system according to the first embodiment except for the points explained below. For this reason, below, the fourth embodiment of the present invention will be explained centered on parts different from the first embodiment.

Figure 15:
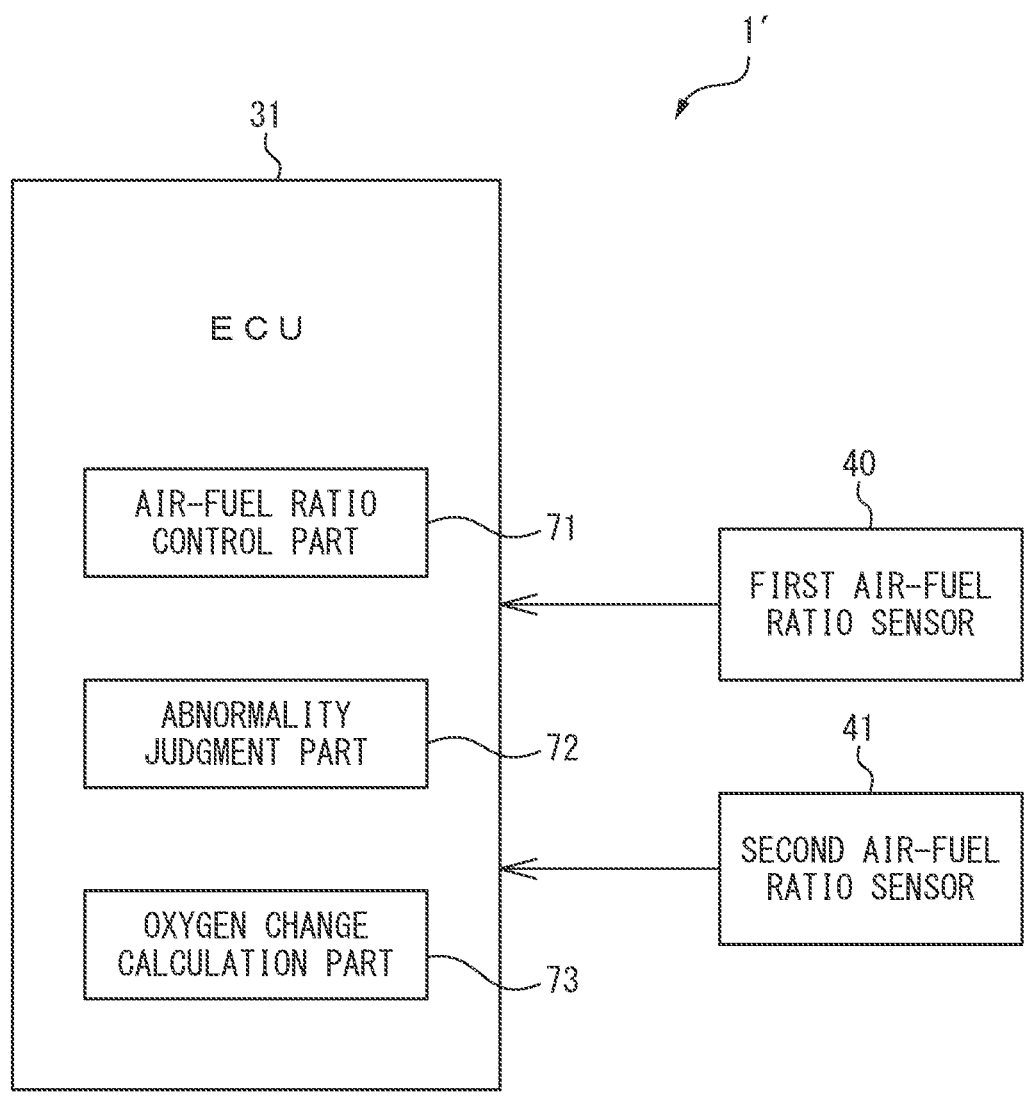
FIG. 15 is a block diagram schematically showing the configuration of an abnormality diagnosis system according to a fourth embodiment of the present invention.

FIG. 15 is a block diagram schematically showing the configuration of the abnormality diagnosis system 1' according to the fourth embodiment of the present invention. The abnormality diagnosis system 1' is provided with the first air-fuel ratio sensor 40, the air-fuel ratio control part 71, the abnormality judgment part 72, and the oxygen change calculation part 73 and diagnoses abnormality of the second air-fuel ratio sensor 41. The first air-fuel ratio sensor 40 is one example of the upstream side air-fuel ratio detection device, while the second air-fuel ratio sensor 41 is one example of the downstream side air-fuel ratio detection device.

As shown in FIG. 1, the second air-fuel ratio sensor 41 is arranged in the exhaust passage of the internal combustion engine at the downstream side of the first catalyst 20 and the upstream side of the second catalyst 23. For this reason, the second air-fuel ratio sensor 41 is affected by the exhaust purification by the first catalyst 20. Therefore, if abnormality of the second air-fuel ratio sensor 41 is diagnosed when the oxygen storage amount of the first catalyst 20 is large, a problem similar to when diagnosing abnormality of the third air-fuel ratio sensor 42 arises.

Therefore, in the fourth embodiment, the oxygen change calculation part 73 calculates the amount of change of the oxygen storage amount of the first catalyst 20 when the air-fuel ratio control part 71 makes the air-fuel ratio of the air-fuel mixture change, and the abnormality judgment part 72 does not judge abnormality of the second air-fuel ratio sensor 41 when the amount of change of the oxygen storage amount of the first catalyst 20 when the air-fuel ratio control part 71 makes the air-fuel ratio of the air-fuel mixture change is less than the lower limit threshold value. On the other hand, when the amount of change of the oxygen storage amount of the first catalyst 20 is equal to or more than the lower limit threshold value, the abnormality judgment part 72 judges abnormality of the second air-fuel ratio sensor 41.

Due to this, it is possible to improve the reliability of diagnosis of abnormality of the second air-fuel ratio sensor 41.

<Processing for Judgment of Abnormality>

Figure 16:
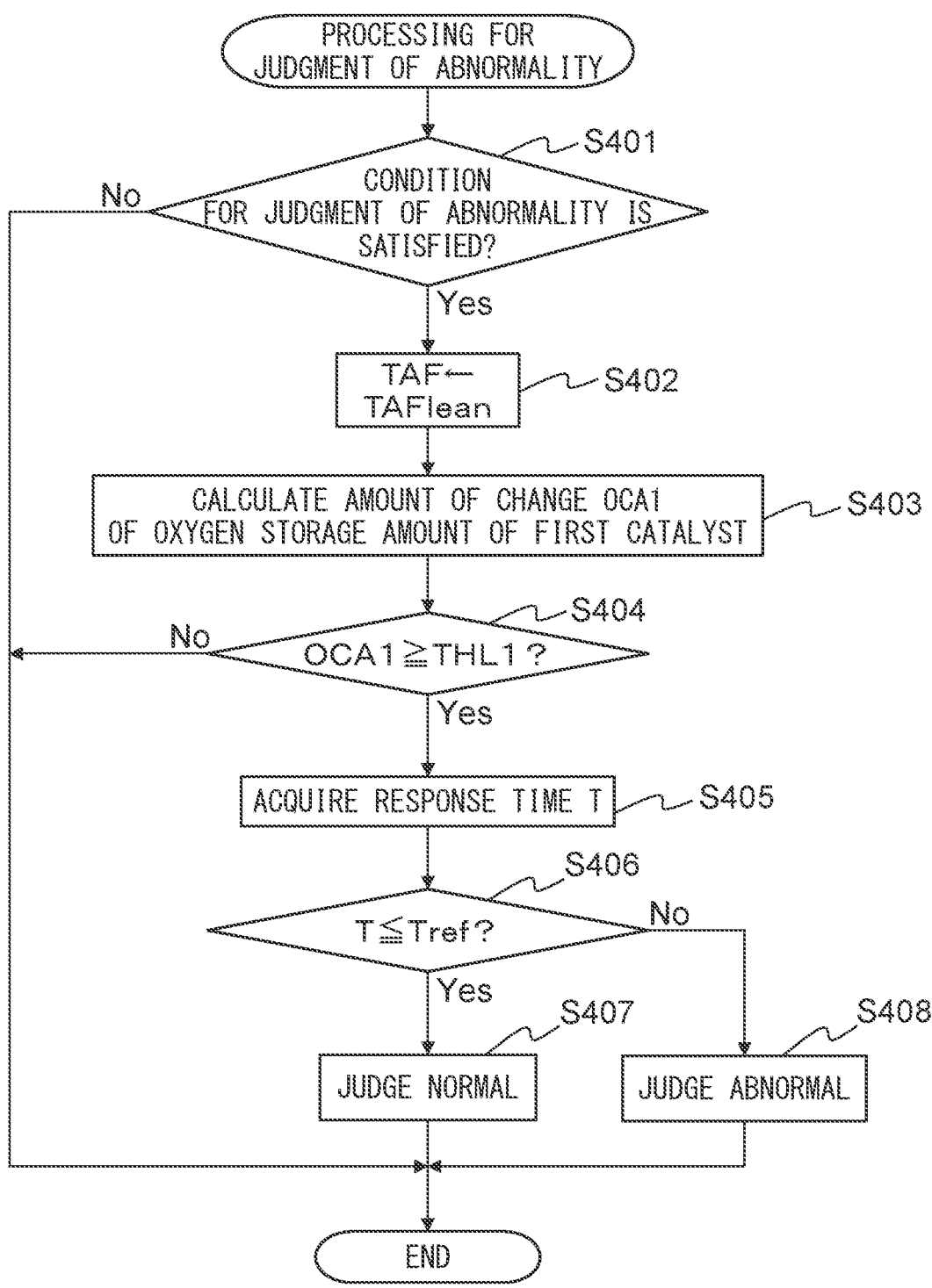
FIG. 16 is a flow chart showing a control routine of processing for judgment of abnormality in the fourth embodiment.

Below, referring to the flow chart of FIG. 16, the control for judging abnormality of the second air-fuel ratio sensor 41 in the fourth embodiment will be explained. FIG. 16 is a flow chart showing a control routine of the processing for judgment of abnormality in the fourth embodiment. The present control routine is repeatedly performed by the ECU 31 after startup of the internal combustion engine.

Step S401 to step S404 are performed in the same way as step S101 to step S104 of FIG. 9. If at step S404 it is judged that the amount of change OCA1 of the oxygen storage amount of the first catalyst 20 is equal to or more than the lower limit threshold value THL1, the present control routine proceeds to step S405.

At step S405, the abnormality judgment part 72 acquires the response time T as the time when the output of the second air-fuel ratio sensor 41 passes a predetermined output section. The predetermined output section is determined in advance and is set to a range leaner than the stoichiometric air-fuel ratio.

Next, at step S406, the abnormality judgment part 72 judges whether the response time T is equal to or less than the reference value Tref. The reference value Tref is determined in advance by experiments, calculations, etc.

If at step S406 it is judged that the response time T is equal to or less than the reference value Tref, the present control routine proceeds to step S407. At step S407, the abnormality judgment part 72 judges that the response characteristic of the second air-fuel ratio sensor 41 is normal. After step S407, the present control routine ends.

On the other hand, if at step S406 it is judged that the response time T is longer than the reference value T, the present control routine proceeds to step S408. At step S408, the abnormality judgment part 72 judges that the response characteristic of the third air-fuel ratio sensor 42 is abnormal and turns on a warning light provided at the vehicle mounting the internal combustion engine. After step S408, the present control routine ends.

Note that, the present control routine can be modified in the same way as the control routine of FIG. 9. Further, in the fourth embodiment, the second catalyst 23 and the third air-fuel ratio sensor 42 may be omitted from the internal combustion engine.

Above, preferred embodiments according to the present invention were explained, but the present invention is not limited to these embodiments and can be corrected and changed in various ways within the language of the claims. For example, the first air-fuel ratio sensor 40, the second air-fuel ratio sensor 41, and the third air-fuel ratio sensor 42 may be oxygen sensors detecting whether the air-fuel ratio of the exhaust gas is rich or lean. In this case, in the above formulas (1) and (2), as the output value I1 of the first air-fuel ratio sensor 40, the output value I2 of the second air-fuel ratio sensor 41, and the output value I3 of the third air-fuel ratio sensor 42, the value of the output voltage, the value of the air-fuel ratio corresponding to the output voltage, etc., may be used.

Further, three or more catalysts may be arranged in the exhaust passage of the internal combustion engine and the abnormality diagnosis of the downstream side air-fuel ratio detection device arranged at the downstream side of the catalyst at the most downstream side may be performed as explained above.

Further, the above-mentioned embodiments can be worked in any combinations. If the second embodiment and third embodiment are combined, in the control routine of FIG. 12, instead of step S202, step S302 of FIG. 14 is performed.

Further, if the second embodiment and the fourth embodiment are combined, the first catalyst 20 is configured as a four-way catalyst, and at step S404 of FIG. 16, the abnormality judgment part 72 judges whether the amount of change OCA1 of the oxygen storage amount of the first catalyst 20 is equal to or more than the lower limit threshold value THL1 and equal to or less than the upper limit threshold value THU. The upper limit threshold value THU is determined in advance and is a value larger than the lower limit threshold value THL1. Further, in the control routine of FIG. 16, step S208 of FIG. 12 is performed between step S405 and step S406.

Further, if the third embodiment and the fourth embodiment are combined, in the control routine of FIG. 16, instead of step S402, step S302 of FIG. 14 is performed.

Further, step S102 to step S110 of FIG. 9 in the first embodiment and step S302 to step S310 of FIG. 14 in the third embodiment may be consecutively performed. That is, the abnormality judgment part 72 may judge abnormality of the downstream side air-fuel ratio detection device based on the output characteristic of the downstream side air-fuel ratio detection device when the air-fuel ratio control part 71 makes the air-fuel ratio of the air-fuel mixture change to leaner than the stoichiometric air-fuel ratio, and the output characteristic of the downstream side air-fuel ratio detection device when the air-fuel ratio control part 71 makes the air-fuel ratio of the air-fuel mixture change to richer than the stoichiometric air-fuel ratio.

REFERENCE SIGNS LIST 1, 1' abnormality diagnosis system
5 combustion chamber
20 first catalyst
22 exhaust pipe
23 second catalyst
31 electronic control unit (ECU)
40 first air-fuel ratio sensor
41 second air-fuel ratio sensor
42 third air-fuel ratio sensor 42
71 air-fuel ratio control part
72 abnormality judgment part
73 oxygen change calculation part

The invention claimed is:

1. An abnormality diagnosis system of a downstream side air-fuel ratio detection device arranged in an exhaust passage of an internal combustion engine at a downstream side of a catalyst, comprising:
an air-fuel ratio control part configured to control an air-fuel ratio of an air-fuel mixture in a combustion chamber of the internal combustion engine;
an abnormality judgment part configured to judge abnormality of the downstream side air-fuel ratio detection device based on a characteristic of change of output of the downstream side air-fuel ratio detection device when the air-fuel ratio control part makes the air-fuel ratio of the air-fuel mixture change, and
an oxygen change calculation part configured to calculate an amount of change of an oxygen storage amount of the catalyst when the air-fuel ratio control part makes the air-fuel ratio of the air-fuel mixture change, wherein
the abnormality judgment part is configured not to judge whether the downstream side air-fuel ratio detection device is abnormal when the amount of change of the oxygen storage amount is less than a lower limit threshold value.

2. The abnormality diagnosis system of a downstream side air-fuel ratio detection device according to claim 1, wherein
the downstream side air-fuel ratio detection device is arranged at a downstream side of a plurality of catalysts,
the oxygen change calculation part is configured to calculate the amount of change of the oxygen storage amount when the air-fuel ratio control part makes the air-fuel ratio of the air-fuel mixture change for each of the plurality of catalysts, and
the abnormality judgment part is configured not to judge whether the downstream side air-fuel ratio detection device is abnormal when the amount of change of the oxygen storage amount of at least one catalyst among the plurality of catalysts is less than the lower limit threshold value.

3. The abnormality diagnosis system of a downstream side air-fuel ratio detection device according to claim 1, further comprising an upstream side air-fuel ratio detection device arranged in the exhaust passage at an upstream side of the catalyst, wherein
the oxygen change calculation part is configured to calculate the amount of change of the oxygen storage amount based on a difference between an output value of the upstream side air-fuel ratio detection device and an output value of the downstream side air-fuel ratio detection device.

4. The abnormality diagnosis system of a downstream side air-fuel ratio detection device according to claim 2, further comprising upstream side air-fuel ratio detection devices arranged in the exhaust passage at an upstream side of each of the plurality of catalysts, wherein
the oxygen change calculation part is configured to calculate the amount of change of the oxygen storage amount based on a difference of output values of the air-fuel ratio detection devices arranged at both sides of the catalyst for each of the plurality of catalysts.

5. The abnormality diagnosis system of a downstream side air-fuel ratio detection device according to claim 2, wherein
at least one of the plurality of catalysts is a four-way catalyst having a filter function for trapping particulate matter in an exhaust gas, and
the abnormality judgment part judges is configured not to judge whether the downstream side air-fuel ratio detection device is abnormal when the amount of change of the oxygen storage amount of the four-way catalyst is larger than an upper limit threshold value larger than the lower limit threshold value.

6. The abnormality diagnosis system of a downstream side air-fuel ratio detection device according to claim 4, wherein
at least one of the plurality of catalysts is a four-way catalyst having a filter function for trapping particulate matter in an exhaust gas, and
the abnormality judgment part judges is configured not to judge whether the downstream side air-fuel ratio detection device is abnormal when the amount of change of the oxygen storage amount of the four-way catalyst is larger than an upper limit threshold value larger than the lower limit threshold value.

7. The abnormality diagnosis system of a downstream side air-fuel ratio detection device according to claim 1, wherein
the catalyst is a four-way catalyst having a filter function for trapping particulate matter in an exhaust gas, and
the abnormality judgment part is configured not to judge whether the downstream side air-fuel ratio detection device is abnormal when the amount of change of the oxygen storage amount is larger than an upper limit threshold value larger than the lower limit threshold value.

8. The abnormality diagnosis system of a downstream side air-fuel ratio detection device according to claim 3, wherein
the catalyst is a four-way catalyst having a filter function for trapping particulate matter in an exhaust gas, and
the abnormality judgment part is configured not to judge whether the downstream side air-fuel ratio detection device is abnormal when the amount of change of the oxygen storage amount is larger than an upper limit threshold value larger than the lower limit threshold value.

9. The abnormality diagnosis system of a downstream side air-fuel ratio detection device according to claim 5, wherein the abnormality judgment part is configured not to judge whether the downstream side air-fuel ratio detection device is abnormal when judging that particulate matter has been burned at the four-way catalyst when the air-fuel ratio control part makes the air-fuel ratio of the air-fuel mixture change.

10. The abnormality diagnosis system of a downstream side air-fuel ratio detection device according to claim 6, wherein the abnormality judgment part is configured not to judge whether the downstream side air-fuel ratio detection device is abnormal when judging that particulate matter has been burned at the four-way catalyst when the air-fuel ratio control part makes the air-fuel ratio of the air-fuel mixture change.

11. The abnormality diagnosis system of a downstream side air-fuel ratio detection device according to claim 7, wherein the abnormality judgment part is configured not to judge whether the downstream side air-fuel ratio detection device is abnormal when judging that particulate matter has been burned at the four-way catalyst when the air-fuel ratio control part makes the air-fuel ratio of the air-fuel mixture change.

12. The abnormality diagnosis system of a downstream side air-fuel ratio detection device according to claim 8, wherein the abnormality judgment part is configured not to judge whether the downstream side air-fuel ratio detection device is abnormal when judging that particulate matter has been burned at the four-way catalyst when the air-fuel ratio control part makes the air-fuel ratio of the air-fuel mixture change.

13. An abnormality diagnosis system of a downstream side air-fuel ratio detection device arranged in an exhaust passage of the internal combustion engine at a downstream side of a catalyst, configured to:
control an air-fuel ratio of an air-fuel mixture in a combustion chamber of the internal combustion engine;
judge abnormality of the downstream side air-fuel ratio detection device based on a characteristic of change of output of the downstream side air-fuel ratio detection device when making the air-fuel ratio of the air-fuel mixture change; and
calculate an amount of change of an oxygen storage amount of the catalyst when making the air-fuel ratio of the air-fuel mixture change, wherein
the abnormality diagnosis system is configured not to judge whether the downstream side air-fuel ratio detection device is abnormal when the amount of change of the oxygen storage amount is less than a lower limit threshold value.

* * * * *